(12) United States Patent
Kamel Ahmed et al.

(10) Patent No.: US 11,735,782 B2
(45) Date of Patent: Aug. 22, 2023

(54) VOLTAGE SHARING OF SERIES CONNECTED BATTERY MODULES IN A PLUG-AND-PLAY DC MICROGRID

(71) Applicants: Mohamed Ahmed Kamel Ahmed, Logan, UT (US); Regan Zane, Hyde Park, UT (US); Dragan Maksimovic, Boulder, CO (US)

(72) Inventors: Mohamed Ahmed Kamel Ahmed, Logan, UT (US); Regan Zane, Hyde Park, UT (US); Dragan Maksimovic, Boulder, CO (US)

(73) Assignee: Utah State University, Logan, UT (US)

(*) Notice: Subject to any disclaimer, the term of this patent is extended or adjusted under 35 U.S.C. 154(b) by 175 days.

(21) Appl. No.: 17/350,880

(22) Filed: Jun. 17, 2021

(65) Prior Publication Data
US 2021/0399352 A1    Dec. 23, 2021

Related U.S. Application Data

(60) Provisional application No. 63/040,431, filed on Jun. 17, 2020.

(51) Int. Cl.
*H01M 10/44* (2006.01)
*H02J 7/00* (2006.01)
(Continued)

(52) U.S. Cl.
CPC ..... *H01M 10/441* (2013.01); *H01M 10/4257* (2013.01); *H01M 10/482* (2013.01);
(Continued)

(58) Field of Classification Search
CPC .......... H01M 10/441; H01M 10/4257; H01M 10/482; H01M 2010/4271; H02J 7/007182; H02J 7/00714; H02J 7/0013; Y02E 60/10
(Continued)

(56) References Cited

U.S. PATENT DOCUMENTS

| | | | |
|---|---|---|---|
| 6,664,762 B2 * | 12/2003 | Kutkut | H02M 3/33561 320/116 |
| 7,944,662 B2 | 5/2011 | Carkner | |

(Continued)

FOREIGN PATENT DOCUMENTS

| | | | | |
|---|---|---|---|---|
| CN | 102916440 B | | 6/2013 | |
| CN | 107696863 A | * | 2/2018 | ................ B60L 1/00 |
| GB | 2541352 A | * | 2/2017 | ................ B60L 1/00 |

OTHER PUBLICATIONS

H. Qian, J. Zhang, J. -S. Lai and W. Yu, "A high-efficiency grid-tie battery energy storage system," in IEEE Transactions on Power Electronics, vol. 26, No. 3, pp. 886-896, Mar. 2011, doi: 10.1109/TPEL.2010.2096562. (Year: 2011).*

(Continued)

*Primary Examiner* — M Baye Diao
(74) *Attorney, Agent, or Firm* — Kunzler Bean & Adamson; Bruce R. Needham

(57) ABSTRACT

An apparatus for voltage sharing of series connected battery modules in a DC microgrid includes a battery management system and a battery module controller that generates, for an $m^{th}$ of N converters connected together to a DC microbus, a droop current $\tilde{i}_{d,m}$ that includes a converter voltage error signal $\tilde{v}_{err,m}$ multiplied by a droop multiplier $g_d(i)$. Each converter is a DC/DC converter connected between a battery module, with one or more battery cells, and the DC microbus. The $m^{th}$ converter uses the droop current $\tilde{i}_{d,m}$, a common current reference $\tilde{i}_{all}$ of a battery pack that includes the (Continued)

battery modules and an input current $\tilde{\imath}_m$ to the $m^{th}$ converter to control switching of the $m^{th}$ converter. The common current reference $\tilde{\imath}_{all}$ is from the battery management system. The voltage error signal $\tilde{v}_{err,m}$ is based on an output voltage $\tilde{v}_{o,m}$ of the $m^{th}$ converter and an average converter output voltage $\tilde{v}_{avg}$eodcmastereodcmastereodcmaster.

20 Claims, 13 Drawing Sheets

(51) Int. Cl.
  *H01M 10/48* (2006.01)
  *H01M 10/42* (2006.01)
(52) U.S. Cl.
  CPC ............ *H02J 7/007182* (2020.01); *H01M 2010/4271* (2013.01)
(58) Field of Classification Search
  USPC .................................................. 320/137
  See application file for complete search history.

(56) References Cited

U.S. PATENT DOCUMENTS

| | | | | |
|---|---|---|---|---|
| 9,368,991 | B2* | 6/2016 | Qahouq | H02J 7/0018 |
| 9,577,530 | B1* | 2/2017 | Ribarich | H02M 3/1588 |
| 10,003,214 | B2* | 6/2018 | Nasiri | H02J 9/061 |
| 10,442,309 | B2* | 10/2019 | Goetz | H02M 7/4835 |
| 10,873,201 | B2* | 12/2020 | Cha | G01R 31/36 |
| 11,245,268 | B1* | 2/2022 | Trippel | H02J 7/0014 |
| 11,469,661 | B2* | 10/2022 | King | H02J 7/00714 |
| 2019/0123394 | A1* | 4/2019 | Cha | H01M 10/48 |
| 2019/0168632 | A1* | 6/2019 | Deng | B60L 50/64 |

OTHER PUBLICATIONS

S. Chowdhury and Y. Sozer, "Adaptive Cell Balancing of Series Connected Batteries Using Hybrid Droop Controller," 2020 IEEE Applied Power Electronics Conference and Exposition (APEC), New Orleans, LA, USA, 2020, pp. 1668-1672, doi: 10.1109/APEC39645.2020.9124524. (Year: 2020).*

Kamel et al., State-of-Charge Control with Series Output Connected DC-DC Modules in Active Battery Management Systems, 2020 IEEE Applied Power Electronics Conference and Exposition (APEC), 2020, pp. 3081-3086, IEEE, United States.

Kamel et al., Voltage Sharing with Series Output Connected Battery Modules in a Plug-and-Play DC Microgrid, IEEE Transactions on Power Electronics, Apr. 29, 2021, IEEE, United States.

Brivio et al., Battery energy storage system for primary control reserve and energy arbitrage, Sustainable Energy, Grid and Networks, Apr. 1, 2016, pp. 152-165, vol. 6.

Li et al., Design and test of a new droop control algorithm for a SMES/battery hybrid energy storage system, Energy, Nov. 5, 2016, pp. 1110-1122, vol. 118.

* cited by examiner

2: Module #5: 2.5 V/div
3: Bus voltage: 5 V/div
4: Output current: 25 A/div (a)

Module #1: 2.5 V/div
Module #2: 2.5 V/div
Module #3: 2.5 V/div
Module #4: 2.5 V/div (b)

VOLTAGE SHARING OF SERIES CONNECTED BATTERY MODULES IN A PLUG-AND-PLAY DC MICROGRID

CROSS-REFERENCE TO RELATED APPLICATIONS

This application claims the benefit of U.S. Provisional Patent Application No. 63/040,431 entitled "VOLTAGE SHARING OF SERIES CONNECTED BATTERY MODULES IN A PLUG-AND-PLAY DC MICROGRID" and filed on Jun. 17, 2020 for Mohamed Ahmed Kamel Ahmed et al., which is incorporated herein by reference.

GOVERNMENT LICENSE RIGHTS

This invention was made with government support under contract #N00014-16-1-2986 awarded by the Office of Naval Research. The government has certain rights in the invention.

FIELD

This invention relates to plug-and-play direct current ("DC") microgrids and more particularly relates to voltage sharing of series connected battery modules in a plug-and-play DC microgrid.

BACKGROUND

In a plug-and-play ("PnP") DC microgrid, sources, battery energy storage, and loads operate seamlessly with each other. PnP microgrids increase modularity and allow hot-swappable operation for any source or load. As a result, PnP microgrids are attractive for mobile DC networks, where renewable sources, mobile battery modules, and loads are frequently inserted and removed from the grid.

SUMMARY

An apparatus for voltage sharing of series connected battery modules in a plug-and-play DC microgrid is disclosed. The apparatus includes a battery module controller and a battery management system. The battery module controller generates, for an $m^{th}$ converter of N converters connected together to a DC microbus, a droop current $\tilde{i}_{d,m}$ that includes a converter voltage error signal $\tilde{v}_{err,m}$ multiplied by a non-linear droop multiplier $g_d(i)$. Each converter of the N converters is a DC/DC converter is connected between a battery module and the DC microbus. The battery module includes one or more battery cells and the $m^{th}$ converter uses the droop current $\tilde{i}_{d,m}$, a common current reference $\tilde{i}_{all}$ of a battery pack comprising the battery modules connected to the N converters and an input current $\tilde{i}_m$ to the $m^{th}$ converter to control switching of the $m^{th}$ converter. The common current reference $\tilde{i}_{all}$ is provided by the battery management system. The voltage error signal $\tilde{v}_{err,m}$ is based on an output voltage $\tilde{v}_{o,m}$ of the $m^{th}$ converter and an average converter output voltage $\tilde{v}_{avg}$.

Another apparatus for voltage sharing of series connected battery modules in a plug-and-play DC microgrid includes a battery module controller, and a battery management system. The battery management system generates, for N converters connected together to a DC microbus, an average converter output voltage $\tilde{v}_{avg}$ by dividing a DC microbus voltage $v_{bus}$ by the number of converters N. Each converter of the N converters is a DC/DC converter is connected between a battery module and the DC microbus and the battery modules of the N converters form a battery pack. The battery module includes one or more battery cells. The battery management system generates a common current reference $\tilde{i}_{all}$ of the battery pack as a function of an average state-of-charge ("SOC") of the battery modules of the battery pack and a bus voltage $v_{bus}$ of the DC microbus. For a voltage range of the bus voltage $v_{bus}$ of the DC microbus between a minimum bus voltage $v_{bus,min}$ corresponding to a minimum state-of-charge $SOC_{min}$ of the battery pack and a maximum bus voltage $v_{bus,min}$ corresponding to a maximum state-of-charge $SOC_{max}$ of the battery pack, the battery management system generates a negative common current reference $\tilde{i}_{all}$ for a lower voltage range and a positive common current reference $\tilde{i}_{all}$ for an upper voltage range above the lower voltage range. For an $m^{th}$ converter of the N converters, the battery module controller for the $m^{th}$ converter uses the average converter output voltage $\tilde{v}_{avg}$ and the common current reference $\tilde{i}_{all}$ along with an input current input current $\tilde{i}_m$ to the $m^{th}$ converter and an output voltage output voltage $\tilde{v}_{o,m}$ of the $m^{th}$ converter to control switching of the $m^{th}$ converter to control the output voltage output voltage $\tilde{v}_{o,m}$ of the $m^{th}$ converter and charging and discharging of the battery module connected to the of the $m^{th}$ converter.

A method for voltage sharing of series connected battery modules in a plug-and-play DC microgrid includes generating, in a battery module controller for an $m^{th}$ converter of N converters connected together to a DC microbus, a droop current $\tilde{i}_{d,m}$ that includes a converter voltage error signal $\tilde{v}_{err,m}$ multiplied by a non-linear droop multiplier $g_d(i)$. Each converter of the N converters is a DC/DC converter connected between a battery module and the DC microbus, the battery module comprising one or more battery cells. The method includes using the droop current $\tilde{i}_{d,m}$, a common current reference $\tilde{i}_{all}$ of a battery pack comprising the battery modules connected to the N converters and an input current $\tilde{i}_m$ to the $m^{th}$ converter to control switching of the $m^{th}$ converter. The common current reference $\tilde{i}_{all}$ is provided by a battery management system. The voltage error signal $\tilde{v}_{err,m}$ is based on an output voltage $\tilde{v}_{o,m}$ of the $m^{th}$ converter and an average converter output voltage $\tilde{v}_{avg}$.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
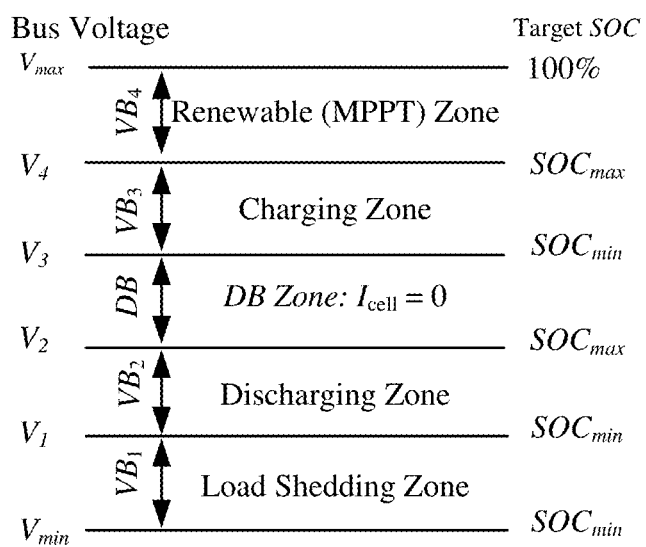
FIG. 1 is schematic block diagram illustrating DC microbus partitions.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or partially a computer program product. Accordingly, aspects of the present invention may take the form of an entirely hardware embodiment, an partial software embodiment (including firmware, resident software, micro-code, etc.) or an embodiment combining software and hardware aspects that may all generally be referred to herein as a "circuit," "module," or "system." Furthermore, portions of the present invention may take the form of a computer program product embodied in one or more computer readable medium(s) having program code embodied thereon.

Many of the functional units described in this specification have been labeled as modules, controllers, systems and the like in order to more particularly emphasize their implementation independence. For example, a module, controller or system (such as the battery management system) may be implemented as a hardware circuit comprising custom VLSI circuits or gate arrays, off-the-shelf semiconductors such as logic chips, transistors, or other discrete components. A module, controller or system may also be implemented in programmable hardware devices such as field programmable gate arrays, programmable array logic, programmable logic devices or the like.

Some aspects of modules, controllers and systems may also be implemented partially in software for execution by various types of processors. An identified module, controller or system of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module, controller or system with program code may be a single instruction, or many instructions, and may even be distributed over several different code segments, among different programs, and across several memory devices. Similarly, operational data may be identified and illustrated herein within modules, controllers or systems, and may be embodied in any suitable form and organized within any suitable type of data structure. The operational data may be collected as a single data set, or may be distributed over different locations including over different storage devices, and may exist, at least partially, merely as electronic signals on a system or network. Where a module, controller or system or portions of a module, controller or system are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for voltage sharing of series connected battery modules in a plug-and-play DC microgrid is disclosed. The apparatus includes a battery module controller and a battery management system. The battery module controller generates, for converter of N converters connected together to a DC microbus, a droop current $\tilde{i}_{d,m}$ that includes a converter voltage error signal $\tilde{v}_{err,m}$ multiplied by a non-linear droop multiplier $g_d(i)$. Each converter of the N converters is a DC/DC converter is connected between a battery module and the DC microbus. The battery module includes one or more battery cells and the $m^{th}$ converter uses the droop current $\tilde{i}_{d,m}$, a common current reference $\tilde{i}_{all}$ of a battery pack comprising the battery modules connected to the N converters and an input current $\tilde{i}_m$ to the $m^{th}$ converter to control switching of the $m^{th}$ converter. The common current reference $\tilde{i}_{all}$ is provided by the battery management system. The voltage error signal $\tilde{v}_{err,m}$ is based on an output voltage $\tilde{v}_{o,m}$ of the $m^{th}$ converter and an average converter output voltage $\tilde{v}_{avg}$.

In some embodiments, the non-linear droop multiplier $g_d(i)$ varies between a minimum droop multiplier $G_{d,min}$ and a maximum droop multiplier $G_{d,max}$. The non-linear droop multiplier $g_d(i)$ is the minimum droop multiplier $G_{d,min}$ during battery discharging and varies linearly between the maximum droop multiplier $G_{d,max}$ at a maximum battery charging rate and the minimum droop multiplier $G_{d,min}$ at a zero charging rate. In other embodiments, the non-linear droop multiplier is $$g_d(i) = \begin{cases} G_{d,min}; & i_{all} \geq 0 \\ G_{d,min} + \dfrac{G_{d,min} - G_{d,max}}{I_{all,max}}; & i_{all} < 0 \end{cases}$$

where:
$i_{all}$ is the common current reference of a battery pack comprising the battery modules connected to the N converters, and
$I_{all,max}$ is a maximum value for the common current reference which correlates to the maximum battery charging rate.

In some embodiments, the $m^{th}$ converter using the droop current $\tilde{i}_{d,m}$, the common current reference $i_{ref}$ and the input current $\tilde{i}_m$ to the $m^{th}$ converter to control switching of the $m^{th}$ converter includes the battery module controller generating, for the $m^{th}$ converter, a converter current reference $\tilde{i}_{ref,m}$ that includes a sum of the droop current $\tilde{i}_{d,m}$ and the common current reference $i_{ref}$, and generating, for the $m^{th}$ converter, a local current command $\tilde{i}_{err,m}$ that includes a difference between the converter current reference $\tilde{i}_{ref,m}$ and an input current $\tilde{i}_m$ to the $m^{th}$ converter. A duty cycle $\tilde{d}_m$ for the $m^{th}$ converter includes the local current command $\tilde{i}_{err,m}$ multiplied by a current compensator $G_{ci}(s)$, wherein the duty cycle controls switching of the $m^{th}$ converter.

In some embodiments, the voltage error signal $\tilde{v}_{err,m}$ is based on the output voltage $\tilde{v}_{o,m}$ of the $m^{th}$ converter and the average converter output voltage $\tilde{v}_{avg}$ includes the battery module controller generating, for the $m^{th}$ converter, the voltage error signal $\tilde{v}_{err,m}$ for the $m^{th}$ converter that includes a difference between the average converter output voltage $\tilde{v}_{avg}$ and the output voltage $\tilde{v}_{o,m}$ of the $m^{th}$ converter.

In some embodiments, the battery management system generates the average converter output voltage $\tilde{v}_{avg}$ by dividing a DC microbus voltage $v_{bus}$ by the number of converters N, and generates the common current reference $\tilde{i}_{all}$ of the battery pack as a function of an average state-of-charge ("SOC") of the battery modules of the battery pack and a bus voltage $v_{bus}$ of the DC microbus. In other embodiments, the battery management system calculates an average SOC for each of the N converters of the battery pack by calculating a difference between an initial average SOC of the battery pack and an integral over a period of time (0 to t) of a common current $i_{all}$ divided by a total charge capacity of the battery pack. In other embodiments, the battery management system generates a current offset for each of the N converters. The current offset for an $m^{th}$ converter of the N converters is based on a current SOC of the $m^{th}$ converter compared to the average state of charge for the N converters and the battery module controller for the $m^{th}$ converter adds the current offset for the $m^{th}$ converter to the common current reference $\tilde{i}_{all}$.

In some embodiments, the battery management system adjusts the current offset for each of the N converters until the SOC of each of the N converters reaches a desired SOC. In other embodiments, the battery management system adjusts the current offset for each of the N converters until the SOC of each of the N converters reaches a same SOC. In other embodiments, the current offset for a converter of the N converters varies between a maximum positive current offset that corresponds to a positive maximum common current reference $I_{max}$ of a positive value of the common current reference $\tilde{i}_{all}$ and zero current offset at zero common current reference $\tilde{i}_{all}$ and varies between a maximum negative current offset that corresponds to a negative maximum common current reference $I_{max}$ of a negative value of the common current reference $\tilde{i}_{all}$ and zero current offset at zero common current reference $\tilde{i}_{all}$. In other embodiments, for a voltage range of the bus voltage $v_{bus}$ of the DC microbus between a minimum bus voltage $v_{bus,min}$ corresponding to a minimum state-of-charge $SOC_{min}$ of the battery pack and a maximum bus voltage $v_{bus,max}$ corresponding to a maximum state-of-charge $SOC_{max}$ of the battery pack, the battery management system generates a negative common current reference $\tilde{i}_{all}$ for a lower voltage range and a positive common current reference $\tilde{i}_{all}$ for an upper voltage range above the lower voltage range.

Another apparatus for voltage sharing of series connected battery modules in a plug-and-play DC microgrid includes a battery module controller, and a battery management system. The battery management system generates, for N converters connected together to a DC microbus, an average converter output voltage $\tilde{v}_{avg}$ by dividing a DC microbus voltage $v_{bus}$ by the number of converters N. Each converter of the N converters is a DC/DC converter is connected between a battery module and the DC microbus and the battery modules of the N converters form a battery pack. The battery module includes one or more battery cells. The battery management system generates a common current reference $\tilde{i}_{all}$ of the battery pack as a function of an average state-of-charge ("SOC") of the battery modules of the battery pack and a bus voltage $v_{bus}$ of the DC microbus. For a voltage range of the bus voltage $v_{bus}$ of the DC microbus between a minimum bus voltage $v_{bus,min}$ corresponding to a minimum state-of-charge $SOC_{min}$ of the battery pack and a maximum bus voltage $v_{bus,max}$ corresponding to a maximum state-of-charge $SOC_{max}$ of the battery pack, the battery management system generates a negative common current reference $\tilde{i}_{all}$ for a lower voltage range and a positive common current reference $\tilde{i}_{all}$ for an upper voltage range above the lower voltage range. For an $m^{th}$ converter of the N converters, the battery module controller for the $m^{th}$ converter uses the average converter output voltage $\tilde{v}_{avg}$ and the common current reference $\tilde{i}_{all}$ along with an input current input current $\tilde{i}_m$ to the $m^{th}$ converter and an output voltage output voltage $\tilde{v}_{o,m}$ of the $m^{th}$ converter to control switching of the $m^{th}$ converter to control the output voltage output voltage $\tilde{v}_{o,m}$ of the $m^{th}$ converter and charging and discharging of the battery module connected to the of the $m^{th}$ converter.

In some embodiments, the battery module controller for an $m^{th}$ converter of converters generates, for the $m^{th}$ converter, a droop current $\tilde{i}_{d,m}$ that includes a converter voltage error signal $\tilde{v}_{err,m}$ multiplied by a non-linear droop multiplier $g_d(i)$. In the embodiments, the $m^{th}$ converter uses the droop current $\tilde{i}_{d,m}$, the common current reference $\tilde{i}_{all}$ and the input current $\tilde{i}_m$ to the $m^{th}$ converter to control switching of the $m^{th}$ converter, and the voltage error signal $\tilde{v}_{err,m}$ is based on an output voltage $\tilde{v}_{o,m}$ of the $m^{th}$ converter and an average converter output voltage $\tilde{v}_{avg}$. In other embodiments, the battery management system calculates an average SOC for each of the N converters of the battery pack by calculating a difference between an initial average SOC of the battery pack and an integral over a period of time (0 to t) of a common current $i_{all}$ divided by a total charge capacity of the battery pack.

In some embodiments, the battery management system calculates an average SOC for each of the N converters of the battery pack by calculating a difference between an initial average SOC of the battery pack and an integral over a period of time (0 to t) of a common current tall divided by a total charge capacity of the battery pack. In other embodiments, the battery management system generates a current offset for each of the N converters, where the current offset for an $m^{th}$ converter of the N converters is based on a current SOC of the $m^{th}$ converter compared to the average state of charge for the N converters and the battery module controller for the $m^{th}$ converter adds the current offset for the $m^{th}$ converter to the common current reference $\tilde{i}_{all}$.

A method for voltage sharing of series connected battery modules in a plug-and-play DC microgrid includes generating, in a battery module controller for an $m^{th}$ converter of N converters connected together to a DC microbus, a droop current $\tilde{i}_{d,m}$ that includes a converter voltage error signal $\tilde{v}_{err,m}$ multiplied by a non-linear droop multiplier $g_d(i)$. Each converter of the N converters is a DC/DC converter connected between a battery module and the DC microbus, the battery module comprising one or more battery cells. The method includes using the droop current $\tilde{i}_{d,m}$, a common current reference $\tilde{i}_{all}$ of a battery pack comprising the battery modules connected to the N converters and an input current $\tilde{i}_m$ to the $m^{th}$ converter to control switching of the $m^{th}$ converter. The common current reference $\tilde{i}_{all}$ is provided by a battery management system. The voltage error signal $\tilde{v}_{err,m}$ is based on an output voltage $\tilde{v}_{o,m}$ of the $m^{th}$ converter and an average converter output voltage $\tilde{v}_{avg}$.

In some embodiments, the non-linear droop multiplier $g_d(i)$ varies between a minimum droop multiplier $G_{d,min}$ and a maximum droop multiplier $G_{d,max}$, where the non-linear droop multiplier $g_d(i)$ is the minimum droop multiplier $G_{d,min}$ during battery discharging and varies linearly between the maximum droop multiplier $G_{d,max}$ at a maximum battery charging rate and the minimum droop multiplier $G_{d,min}$ at a zero charging rate, wherein the non-linear droop multiplier $g_d(i)$ is $$g_d(i) = \begin{cases} G_{d,min}: & i_{all} \geq 0 \\ G_{d,min} + \dfrac{G_{d,min} - G_{d,max}}{I_{all,max}}: & i_{all} < 0 \end{cases}$$

where:

$i_{all}$ is the common current reference of a battery pack comprising the battery modules connected to the N converters, and $I_{all,max}$ is a maximum value for the common current reference which correlates to the maximum battery charging rate.

In some embodiments, the $m^{th}$ converter using the droop current $\tilde{i}_{d,m}$, the common current reference $i_{ref}$ and the input current $\tilde{i}_m$ to the $m^{th}$ converter to control switching of the $m^{th}$ converter includes generating, with the battery module controller for the $m^{th}$ converter, a converter current reference $\tilde{i}_{ref,m}$ that includes a sum of the droop current $\tilde{i}_{d,m}$ and the common current reference $i_{ref}$, and generating, with the battery module controller for the $m^{th}$ converter, a local current command $\tilde{i}_{err,m}$ that includes a difference between the converter current reference $\tilde{i}_{ref,m}$ and an input current $\tilde{i}_m$ to the $m^{th}$ converter. A duty cycle $d_m$ in the battery module controller the $m^{th}$ converter includes the local current command $\tilde{i}_{err,m}$ multiplied by a current compensator $G_{ci}(s)$, wherein the duty cycle controls switching of the $m^{th}$ converter.

I. Introduction

In a plug-and-play (PnP) direct current ("DC") microgrid, sources, battery energy storage, and loads operate seamlessly with each other. PnP microgrids increase modularity and allow hot-swappable operation for any source or load. As a result, PnP microgrids are attractive for mobile DC networks, where renewable sources, mobile battery units, and loads are frequently inserted and removed from the grid. The grid elements typically rely on a predefined voltage map where the DC bus voltage is used to indicate the state of the system, in an approach that is often referred to as "DC bus signaling." The bus voltage determines the average state-of-charge ("SOC") of all batteries in the grid, and provides an estimate for the net power consumption. FIG. 1 shows a conceptual voltage map where the voltage varies in a relatively wide range within the minimum and maximum voltages $V_{min}$, and $V_{max}$, respectively. The DC bus voltage is partitioned into different bands. The battery management system ("BMS") of a battery pack connected to the bus regulates the SOC according to the measured voltage $V_{bus}$. For example, the battery discharges to $SOC_{min}$ if $V_{min} \leq V_{bus} \leq V_1$, and charges to $SOC_{max}$ if $V_3 \leq V_{bus} \leq V_4$. In the dead band ("DB") zone, batteries neither charge nor discharge. Excess generation raises the voltage to $V_4 \leq V_{bus} \leq V_{max}$, where all battery modules charge to 100%. As a result, all batteries connected to this grid can have a matched SOC. In some embodiments, the DB zone is removed, is small or negligible.

The terminal voltage of a Lithium-ion battery cell is relatively low compared to a PnP DC microgrid bus voltage, which is why battery packs typically include a number of cells connected in series. Furthermore, cell mismatches are inevitable in large battery packs, where the role of a BMS and cell balancing algorithms become critical. Active balancing systems consist of modular DC/DC converters connected across each battery cell or groups of cells to implement balancing objectives. Active balancing systems may also be capable of regulating the state-of-health ("SOH") of each cell, which, in some instances, extends the lifetime of the battery pack. Such SOH balancing is typically not feasible in conventional passive balancing systems.

Figure 2:
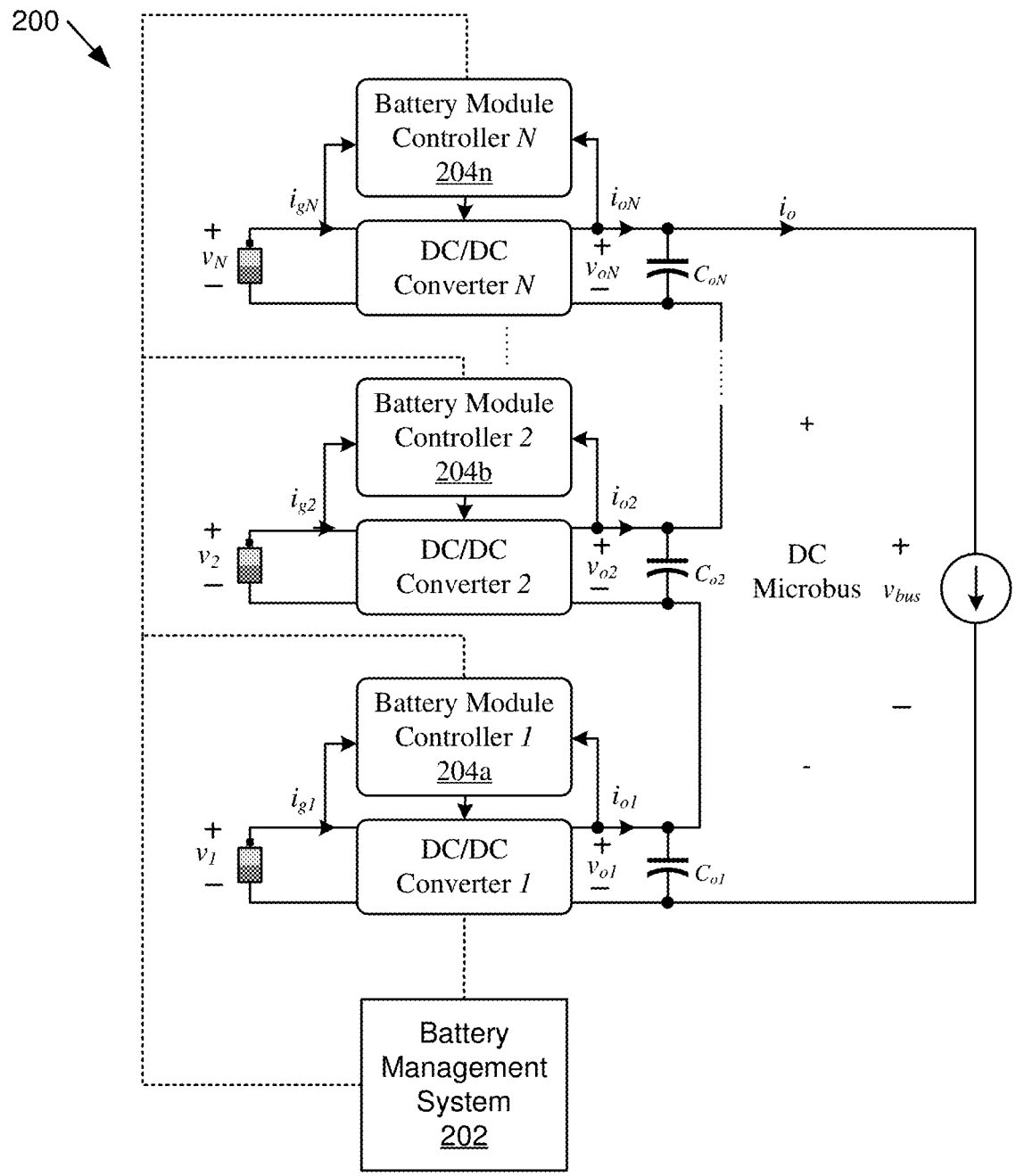
FIG. 2 is a schematic block diagram illustrating one embodiment of a DC microbus system with a series connected active batteries.

Modular converters can be more reliable and efficient than a centralized converter. For a microgrid 200, a high voltage battery pack can be formed by a series connection of N DC/DC converters fed by individual battery cells, as shown in FIG. 2, where the BMS 202 regulates the average SOC according to the bus voltage $V_{bus}$. Steady-state conditions for SOC balancing have been discussed in other references. In some references, each module consists of a single converter regulating its output voltage to obtain a fixed bus voltage. A multilevel approach is presented previously, while the series connection is achieved magnetically through a high-frequency AC link in another reference.

In embodiments discussed herein, the BMS 202 functions are integrated with the series connected boost DC/DC converters to operate in a PnP DC microgrid following a voltage map, as shown in FIG. 1. Other embodiments where the DC/DC converters are connected in parallel and other embodiments where the DC/DC converters are connected both in series and in parallel are anticipated herein and the control techniques discussed herein work equally as well. In other embodiments, the DC/DC converter is a topology other than a boost converter. Modularity and the overall system operation depend on the total output voltage sharing between the series connected modules, which is the focus of the embodiments described herein. As used herein a "module" is a DC-DC converter, a battery module controller and attached battery module. In the system considered, the battery pack, that includes battery modules, behaves as a constant current source with respect to the DC bus, which simplifies the battery pack integration in the PnP microgrid. All DC/DC converters utilize the input (cell) current sensor for SOC estimation and current regulation, which eliminates the need for output current sensors in each DC/DC converter. It is further shown that there is an asymmetry between the charging and discharging modes, which causes the module output voltages to diverge during charging. To address this issue, the embodiments described herein introduce a current/voltage (I-V) droop with a variable droop gain to achieve proper voltage sharing among all series modules during charging.

II. Control Architecture

Before discussing the proposed control approach, this section summarizes limitations of the existing control schemes for series-connected converters.

A. Limitations of Voltage Regulation

A series connection of DC/DC converters supplied by a fixed voltage source is addressed in some references, while the approaches in other references are more specifically focused on series converter connections in BMS application. Most of the previously presented approaches, which rely on regulating the output voltage of the individual converters in a string, cannot be applied directly to a PnP DC microgrid.

Figure 3:
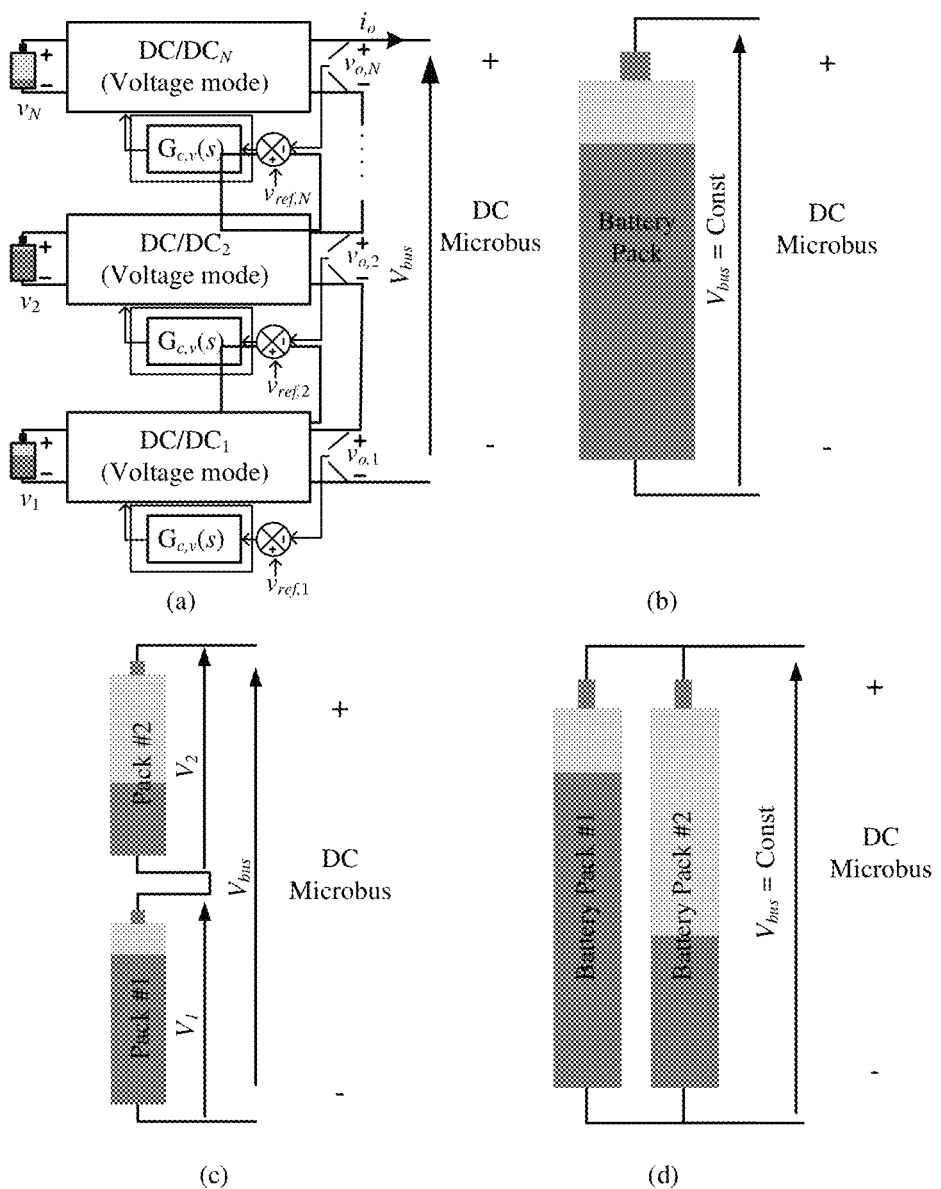
FIG. 3 is schematic block diagram illustrating a system-level representation for a series connected battery pack with (a) output voltage regulation, (b) equivalent two-terminal battery pack, (c) series connected battery packs, and (d) parallel connected battery packs.

For example, FIG. 3(a) depicts the series connected modules under voltage regulation, where each DC/DC converter regulates its output voltage. FIG. 3(b) shows an equivalent model for the overall battery pack under voltage regulation where the bus voltage $V_{bus}$ is constant.

In one reference, the voltage reference for a module depends on its average SOC and a fixed reference voltage. In another reference, the control architecture changes between charging and discharging modes of operation. During discharging, all converters regulate their output voltages; however, a single converter regulates its input current while "N−1" converters regulate their output voltages during charging. This type of mode switching complicates the overall design and requires fast detection for implementation. Moreover, assuming a constant output voltage by each module eliminates the possibility of bypassing a single module in case of a failure or maintenance situations. If there is a desire to increase the overall voltage of the entire microgrid, connecting the packs in series as in FIG. 3(c) becomes challenging as the capacities and SOCs of each pack vary, which reduces the overall system modularity. As each pack regulates its output voltage to a constant value $V_{bus}$, paralleling packs of different capacities and chemistries as in FIG. 3(d) leads to circulating currents between the packs. Without knowledge of all cell capacities, it is difficult to achieve SOH balancing. In conclusion, voltage regulation approaches are not well suited for PnP DC micro-grid applications, where any source and load can be plugged in or out frequently, which implies that the voltage may vary over a relatively wide range.

B. Proposed Approach: Current Regulation

Figure 4:
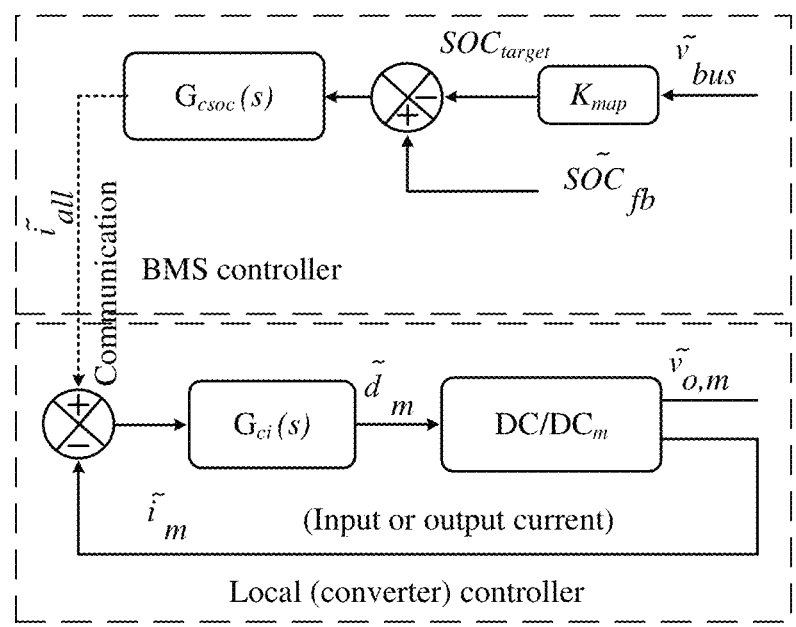
FIG. 4 is a schematic block diagram illustrating one embodiment of a current regulation approach for a DC-to-DC converter.

As the DC voltage of a PnP DC microgrid varies, sources and battery packs may conveniently behave as current sources, which inject or absorb power [25]. Consequently, it becomes feasible to connect multiple packs of different capacities or chemistries in parallel. FIG. 4 shows a block diagram of a current control approach. The BMS 202 estimates an average SOC by acquiring all cell voltages and currents through a communication network. The estimated average $SOC_{fb}$ is regulated to $SOC_{target}$, which depends on the measured voltage $V_{bus}$ and a constant $K_{map}$ that depends on the voltage map. The output of SOC compensator $G_{soc}$ is a common current reference for all series modules $$\tilde{i}_{all} = G_{soc}(\tilde{SOC}_{fb} - K_{map}\tilde{v}_{bus}) \quad (1)$$

which is transmitted to each module over the existing communication network.

The current reference of equation (1) can be a reference for either the input or the output current of each DC/DC converter. The current compensator $G_{ci}$ runs on each DC/DC converter to track the common current reference by changing the duty cycle of the converter $\tilde{d}_m$. In a battery system, all cell currents are monitored for SOC and capacity estimation purposes. Adding an extra current sensing circuitry for output current measurement increases the overall cost and system complexity. Instead, the system described in the embodiments described herein utilizes the input current sensing for both SOC estimation and current regulation to achieve the BMS objectives and compliance with the voltage map of the PnP DC microgrid.

III. Voltage Sharing

Figure 5:
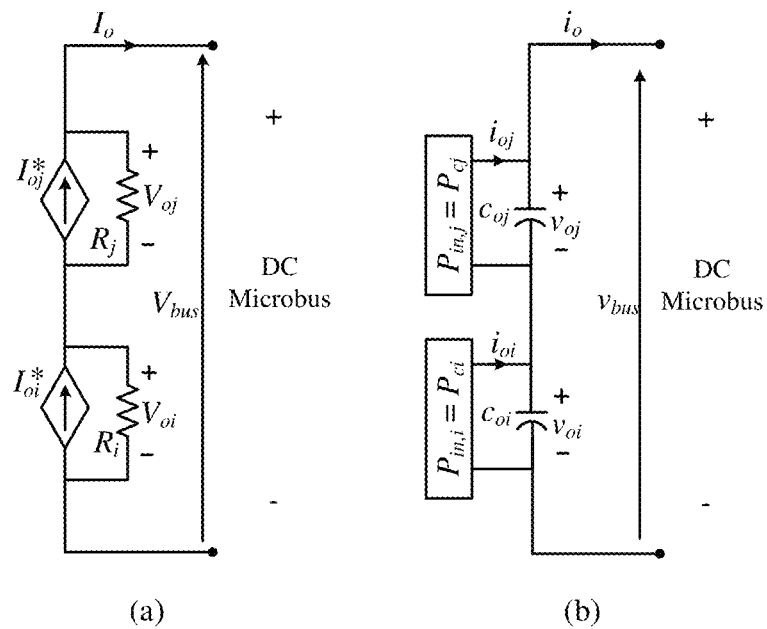
FIG. 5 is a schematic block diagram illustrating one embodiment of an equivalent module of two series modules with (a) current source behavior and (b) constant power behavior.

Voltage sharing across the serially connected modules depends on power sharing among the modules. Consider the case when two modules are connected in series, as shown in FIG. 5(a), where the $i^{th}$ converter behaves as a constant current source $I_{oi}^*$, which contributes to the load current $I_o$, $$I_o = I_{oi}^* - \frac{V_{oi}}{R_i} \quad (2)$$

$$V_{bus} = V_{oi} + V_{oj} \quad (3)$$

Voltage $V_{oi}$ across the $i^{th}$ converter is measured using a voltage divider having a total resistance $R_i$. Bus voltage $V_{bus}$ is distributed across the two modules, $$V_{oi} = \frac{R_i}{R_i + R_j} V_{bus} - \frac{R_i R_j}{R_i + R_j}[I_{oi}^* - I_{oj}^*] \quad (4)$$

If the two modules have identical components, voltage $V_{bus}$ is distributed equally across them assuming the same current reference $I_{oi}^* = I_{oj}^*$. Although the two modules may have a well-matched sensing circuit, component tolerances are inevitable, $R_i \neq R_j$. Moreover, the two converters do not necessarily track the common current reference exactly, so that $I_{oi} \neq I_{oj}^*$. As a result, a voltage sharing error arises due to the mismatches between the current regulation loops. It is important to note that the voltage sharing errors due to the voltage and current sensing circuits are operating point independent if the output current regulation is employed. However, by regulating the input current, voltage sharing error due to current sensing become operating point dependent.

Given that the terminal cell voltage is relatively low in a microgrid application, step-up converters are utilized for battery cell-level control. In an ideal boost converter, the relationship between the output and the input current is given by $$I_o = D_p I_{in} \quad (5)$$

Where $I_o$ is the output current of the converter, $I_{in}$ is the input current, and $D_p$ is the complementary duty cycle, $D_p = 1 - D$. By regulating the input current of each converter, voltage $V_{oi}$ across the $i^{th}$ converter becomes operating point dependent, $$V_{oi} = \frac{R_i}{R_i + R_j} V_{bus} - \frac{R_i R_j}{R_i + R_j}[D_{pi} I_{oi}^* - D_{pj} I_{oj}^*]. \quad (6)$$

As evident in equation (6), the voltage sharing errors due to the differences in current regulation depend on the complementary duty cycle of each converter, which depends on differences among SOCs, converter losses, and the operating point on the voltage map.

IV. Asymmetrical Charging and Discharging

Figure 6:
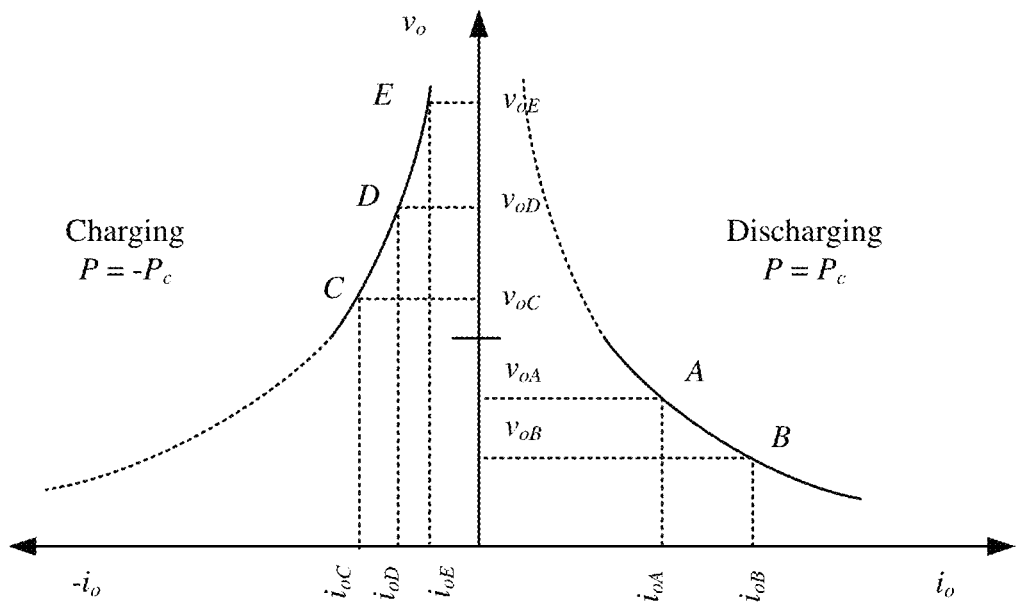
FIG. 6 illustrates one embodiment of constant power curves during discharging and charging.

The charging and discharging voltages (bands) for a battery pack are different, as shown in FIG. 1. By employing either input or output current regulation, from a system-level perspective, an asymmetry arises between the charging and discharging behaviors. The terminal voltage of each battery cell can be considered constant within short time intervals. As the converters regulate the input currents, each DC/DC converter behaves as a constant power source during discharging, and as a constant power load during charging. FIG. 5(b) shows the corresponding steady-state models for two converters connected in series. The bus output voltage $V_{bus}$ is shared between the two converters as $v_{oi}$ and $v_{oj}$. FIG. 6 shows the constant power curves for the converters. The discharging power is associated with positive currents $i_{oi}$ and $i_{oj}$. The discharging voltage band is depicted using a solid line, and the dotted curve indicates a voltage outside the discharging band. Similarly, the charging power is associated with negative currents $i_{oi}$ and $i_{oj}$, the charging voltage band is depicted using a solid line, and the dotted curve indicates a voltage outside the charging band. The dynamic equation for the output capacitor in the $i^{th}$ converter is $$C_{oi}\frac{dv_{oi}}{dt} = i_{oi} - I_o. \tag{7}$$

Consider an equilibrium point A for the output voltage voi in the discharging zone. If a perturbation on the output voltage $v_{oi}$ reduces the voltage from point A to point B, current $i_{oi}$ increases to maintain the same power. For the same load current $I_o$, the increase in the output current charges the capacitor $C_{oi}$ and then increases the output voltage, which then, through a negative feedback mechanism, brings the operation back to the equilibrium point A.

In the charging case, if a perturbation on the output voltage $v_{oi}$ increases the voltage from point C to point D, current $i_{oi}$ drops to maintain the same power. For the same charging current $-I_o$, the net capacitor current is positive, and charges the capacitor $C_{oi}$, which then increases the output voltage. Due to the net positive feedback, the operating point diverges to point D, then E. Eventually, one module carries all the bus voltage, and voltage and power sharing are lost. Such an event is catastrophic for a modular system, where all components are rated for a significantly lower voltage compared to the overall bus voltage $v_{bus}$, and significantly lower power compared to the overall system power rating. For the series connection shown in FIG. 2, the worst-case scenario occurs when the bus voltage $v_{bus}$ changes from the discharging bands $VB_1$ and $VB_2$ to the maximum power point ("MPPT") band $VB_4$, where the slope of the i-v curve is steepest.

V. Voltage Sharing Using Droop

Due to the system-level instability concerns associated with the charging mode discussed in Section IV, there is a need to ensure that all modules share the voltage, and track the average voltage of the entire bus in all operating modes. Therefore, the control scheme introduced in FIG. 4 is modified by introducing a droop, as shown in FIG. 7.

Figure 7:
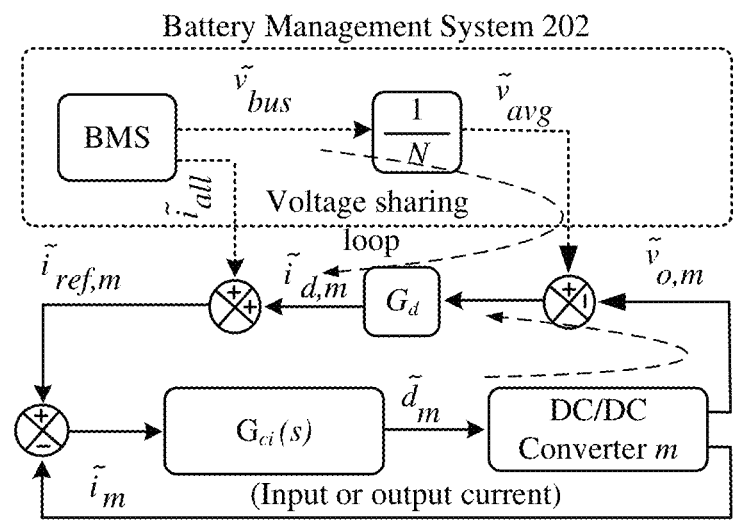
FIG. 7 is a schematic block diagram illustrating one embodiment of current regulation with voltage sharing (droop) loop for a DC-to-DC converter.

As shown in FIG. 7, the BMS 202 transmits the average voltage of the bus $$\tilde{v}_{avg} = \frac{\tilde{v}_{avg}}{N}.$$

Each converter calculates the difference between the output voltage of the module $\tilde{v}_{o,m}$ and the average voltage of the entire pack $\tilde{v}_{avg}$. A droop multiplier $G_d$ converts the voltage difference into a corresponding droop current referred to the input side of the converter $\tilde{i}_{d,m}$ by $$i_{d,m} = G_d(\tilde{v}_{avg} - \tilde{v}_{o,m}) \tag{8}$$

Finally, the local input current command is a superposition of the common current reference used for the pack average SOC regulation $\tilde{i}_{ref,all}$ and the (I-V) droop current for voltage sharing $\tilde{i}_{d,m}$ $$\tilde{i}_{ref,m} = \tilde{i}_{ref,all} - \tilde{i}_{d,m}. \tag{9}$$

Figure 8:
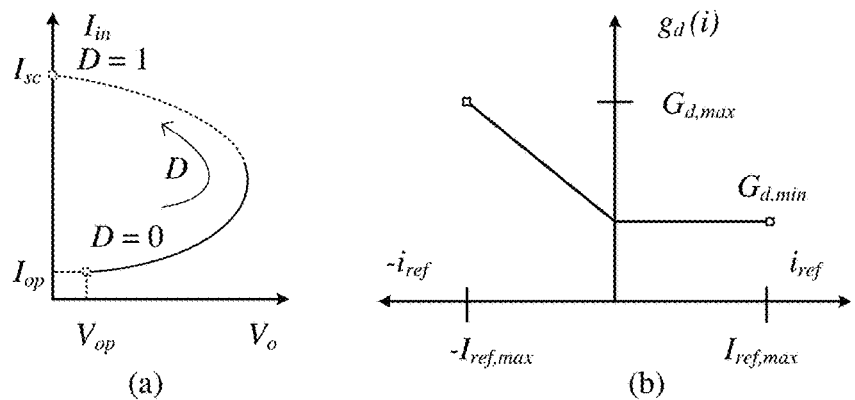
FIG. 8 depicts steady-state trajectories for (a) Boost converter $I_{in}$-$V_o$ characteristics and (b) variable droop coefficient $g_d$ curve.

Introduction of the droop loop that modifies the input current command based on the output voltage of the converter results in a duty cycle dependency. The duty cycle dependency is related to the steady-state input current and output voltage $(I_{in}/V_o)$ characteristics of the converter. For example, the relationship is linear for a buck converter. However, FIG. 8(a) shows the $(I_{in}/V_o)$ characteristics of a boost converter. The slope at any point depends on the converter parameters and the duty ratio $$\frac{\partial i_{in}}{\partial v_o} = \frac{\left[\frac{2}{R_{load}} + \frac{I_o}{V_o}\right]}{D_p} \tag{10}$$

Assuming a resistive load $R_{load}$ across the converter, at D=0 the steady state input current is $$I_{op} = \frac{V_{in}}{R_{load}}$$

as tile output voltage $V_o$ equals the input voltage $V_{in}$. As the duty cycle approaches unity, the current is limited to $I_{sc}$ by the current sense resistor (and all parasitic resistors) in the series path.

Equation (10) is evaluated for an ideal boost converter supplying a resistive load $R_{load}$ and a constant current load $I_o$, where the slope is evaluated at $V_o$ is the output voltage due to the operating duty cycle (D=1-$D_p$), where $D_p$ is the complementary duty cycle of the converter. In steady state, $$I_o = D_{p1}I_{in} \tag{11}$$

$$V_{in} = D_{p1}V_o \tag{12}$$

$$I_o = D_{p2}(I_{in} + \Delta I_{in}) \tag{13}$$

$$V_{in} = D_{p2}(V_o + \Delta V_o) \tag{14}$$

$$\Delta I_{in} = \frac{I_{in}}{V_o}\Delta V_o \tag{15}$$

which shows how the current required to change the output voltage by unity depends on the operating point. The droop multiplier $G_d$ is therefore $$\frac{I_{in}}{V_o}.$$

As a result of the asymmetrical behavior between the discharging and charging modes of the series connected modules, reflecting the droop loop to the input side of the converter, and the boost converter characteristics, there is a need to vary the droop gain with the operating point of the converter. FIG. 8(b) shows a simple relationship between the droop multiplier $g_d(i)$ as a function of the common current command $i_{ref}$, $$g_d(i) = \begin{cases} G_{d,min}: & i_{ref} \geq 0 \\ G_{d,min} + \frac{G_{d,min} - G_{d,max}}{I_{ref,max}}: & i_{ref} < 0 \end{cases} \tag{15}$$

In the discharging region, the system naturally balances the voltages, as shown in Section IV, where a droop multiplier of $G_{d,min}$ is utilized. In the charging zone, the droop multiplier scales linearly with current, where $G_{d,max}$ is obtained at the highest charging current.

In some embodiments, a battery management controller 204*m* generates, for an $m^{th}$ converter of N converters connected together to a DC microbus, a droop current $\tilde{i}_{d,m}$ that is the converter voltage error signal multiplied by a non-linear droop multiplier $g_d(i)$, where each converter of the N converters is a DC/DC converter connected between a battery unit and the DC microbus. The $m^{th}$ converter uses the droop current $\tilde{i}_{d,m}$, a common current reference $\tilde{i}_{all}$ of a battery pack that includes the battery modules connected to the N converters and an input current $\tilde{i}_m$ to the $m^{th}$ converter to control switching of the $m^{th}$ converter. The common current reference $\tilde{i}_{all}$ is provided by the battery management system 202. The voltage error signal is based on an output voltage $\tilde{v}_{o,m}$ of the $m^{th}$ converter and an average converter output voltage $\tilde{v}_{avg}$.

In some embodiments, the non-linear droop multiplier $g_d(i)$ varies between a minimum droop multiplier $G_{d,min}$ and a maximum droop multiplier $G_{d,max}$, where the non-linear droop multiplier $g_d(i)$ is the minimum droop multiplier $G_{d,min}$ during for battery discharging and varies linearly between the maximum droop multiplier $G_{d,max}$ at a maximum battery charging rate and the minimum droop multiplier $G_{d,min}$ at a zero charging rate. In other embodiments, the non-linear droop multiplier $g_d(i)$ is as in equation (15).

For the $m^{th}$ converter using the droop current $\tilde{i}_{d,m}$, the common current reference $i_{ref}$ and the input current $\tilde{i}_m$ to the $m^{th}$ converter to control switching of the $m^{th}$ converter, the battery module controller 204*m* generates, for the $m^{th}$ converter, a converter current reference $\tilde{i}_{ref,m}$ that is a sum of the droop current $\tilde{i}_{d,m}$ and the common current reference $i_{ref}$; generates, for the $m^{th}$ converter, a local current command $i_{err,m}$ that is a different between the converter current reference $\tilde{i}_{ref,m}$ and an input current $i_m$ to the $m^{th}$ converter, and a duty cycle $\tilde{d}_m$ for the $m^{th}$ converter includes the local current command $\tilde{i}_{err,m}$ multiplied by a current compensator $G_{ci}(s)$, where the duty cycle controls switching of the $m^{th}$ converter.

In some embodiments, the voltage error signal being based on the output voltage $\tilde{v}_{o,m}$ of the $m^{th}$ converter and the average converter output voltage $\tilde{v}_{avg}$ includes the battery module controller 204*m* generating, for the $m^{th}$ converter, a converter voltage error signal $\acute{v}_{err,m}$ that is a difference between the average converter output voltage $\tilde{v}_{avg}$ and the output voltage $\tilde{v}_{o,m}$ of the $m^{th}$ converter. In other embodiments, for a voltage range of the bus voltage $v_{bus}$ of the DC microbus between a minimum bus voltage $v_{bus,min}$ corresponding to a minimum state-of-charge $SOC_{min}$ of the battery pack and a maximum bus voltage $v_{bus,max}$ corresponding to a maximum state-of-charge $SOC_{max}$ of the battery pack, the battery management system generates a negative common current reference $\tilde{i}_{all}$ for a lower voltage range and a positive common current reference $\tilde{i}_{all}$ for an upper voltage range above the lower voltage range.

VI. Experimental Results

Figure 9:
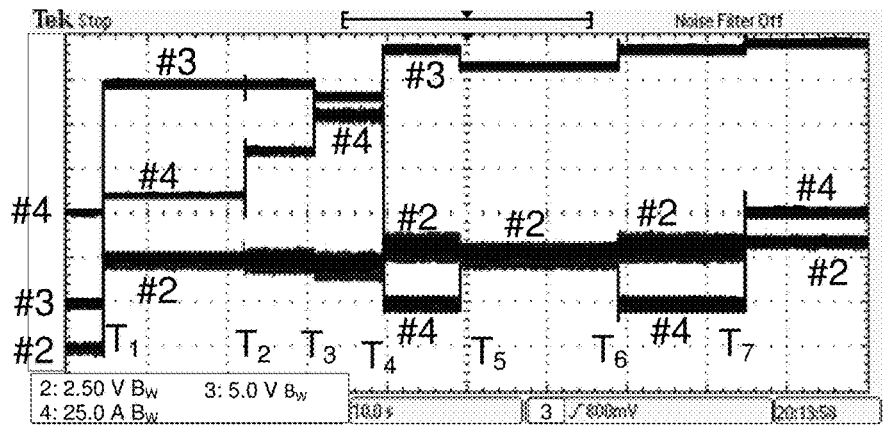
FIG. 9 depicts experimental results during operation with (a) scope traces for the total voltage, output current, and one module voltage and (b) output voltage scope traces for four modules.
Figure 9:
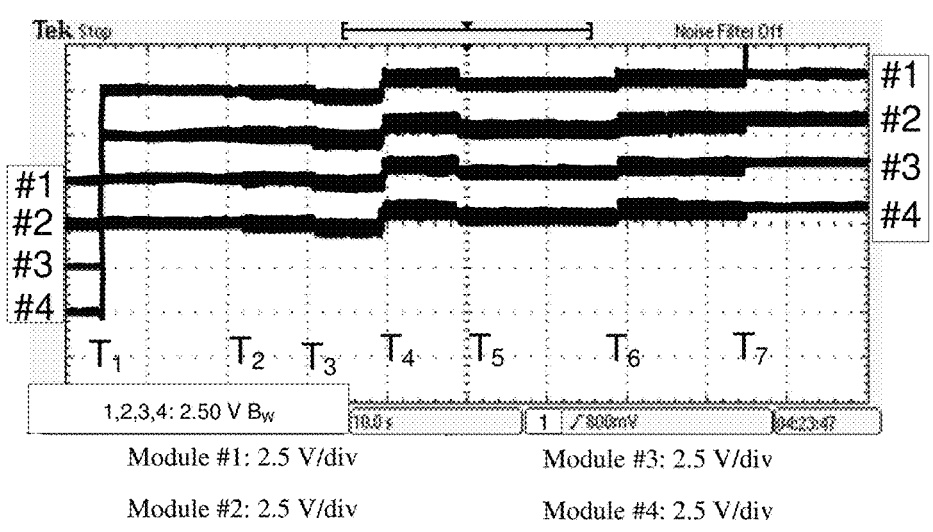

An experimental prototype consisting of 15 Panasonic® lithium-ion NMC battery cells connected to 15 independent four-switch buck-boost DC/DC converters has been developed, as shown in FIG. 9. Each group of three DC/DC converters form a module by paralleling their outputs and utilizing a single microcontroller. A total of five modules are connected in series. A BMS board relies on Controller Area Network ("CAN") bus communication for conventional BMS functions as well as for regulation purposes. The overall system with 15 DC-DC converters is rated at 1.5 kW.

Each converter achieves 97.8% peak efficiency at 100% load. Table I lists the prototype parameters.

TABLE I

PROTOTYPE DAB PARAMETERS

| Parameter | Value |
|---|---|
| Cell Capacity | 25 Ah |
| Maximum input current | ±25 A |
| Number of cells | 15 |
| Number of converters | 15 |
| Number of modules | 5 |
| Maximum discharging voltage $V_2$ | 26 V |
| Minimum charging voltage $V_3$ | 26 V |
| Maximum charging voltage $V_{max}$ | 35 V |
| Maximum output current $I_{o,max}$ | ±62 A |
| Power rating | 1.5 kW |
| Minimum droop gain $G_{d,min}$ | 2 A/V |
| Maximum droop gain $G_{d,max}$ | 14 A/V |

During microgrid startup, the DC/DC converters operate in buck mode. During normal operation, the DC/DC converters operate in boost mode. The battery pack prototype monitors the output current for protection purposes. In this section, positive output current is associated with discharging, and negative output current is associated with charging. Positive current, which corresponds to a load on the DC bus, flows into the bidirectional source.

FIG. 9 shows operation of the battery pack and voltage sharing among the modules, with scope traces shown for the bus voltage, output current, and all individual module voltages. At $t_1$, the pack initiates the DC bus at a 10 A constant current load and moves from the $VB_1$ zone by transmitting a common input current reference $\tilde{i}_{ref,all}$ message to all DC/DC converters. The output voltage increases smoothly as the DC/DC converters operate in buck mode. At $t_2$, the pack continues discharging at a 35 A load and operates within $VB_2$ zone, and all DC/DC converters operate in boost mode. At $t_3$, the pack supplies a 60 A load as the voltage drops into the VB 1 zone. Between $t_4$ and $t_5$, the pack charges as the bus moves to the $VB_4$ zone. At $t_5$, the charging current drops as the bus voltage falls inside the $VB_3$ zone. At $t_7$, the pack shuts down. It can be observed from the scope traces in FIG. 9(*b*) and the output voltage for the $5^{th}$ module in FIG. 9(*a*) that all modules share the bus voltage (and therefore power) equally.

In the considered system, a heavy load or short circuit at the output reduces the bus voltage to $VB_1$ or below $V_{min}$, where the BMS 202 tends to regulate the average SOC to $SOC_{min}$. This would result in excessive input currents from the cells, which can damage the entire battery pack. Consequently, the battery pack monitors the output current for protection purposes. SOC regulation and output current regulation loops run simultaneously in the BMS controller 204. The pack behaves as a constant current source or load on the bus if the output current exceeds the set limits.

Figure 10:
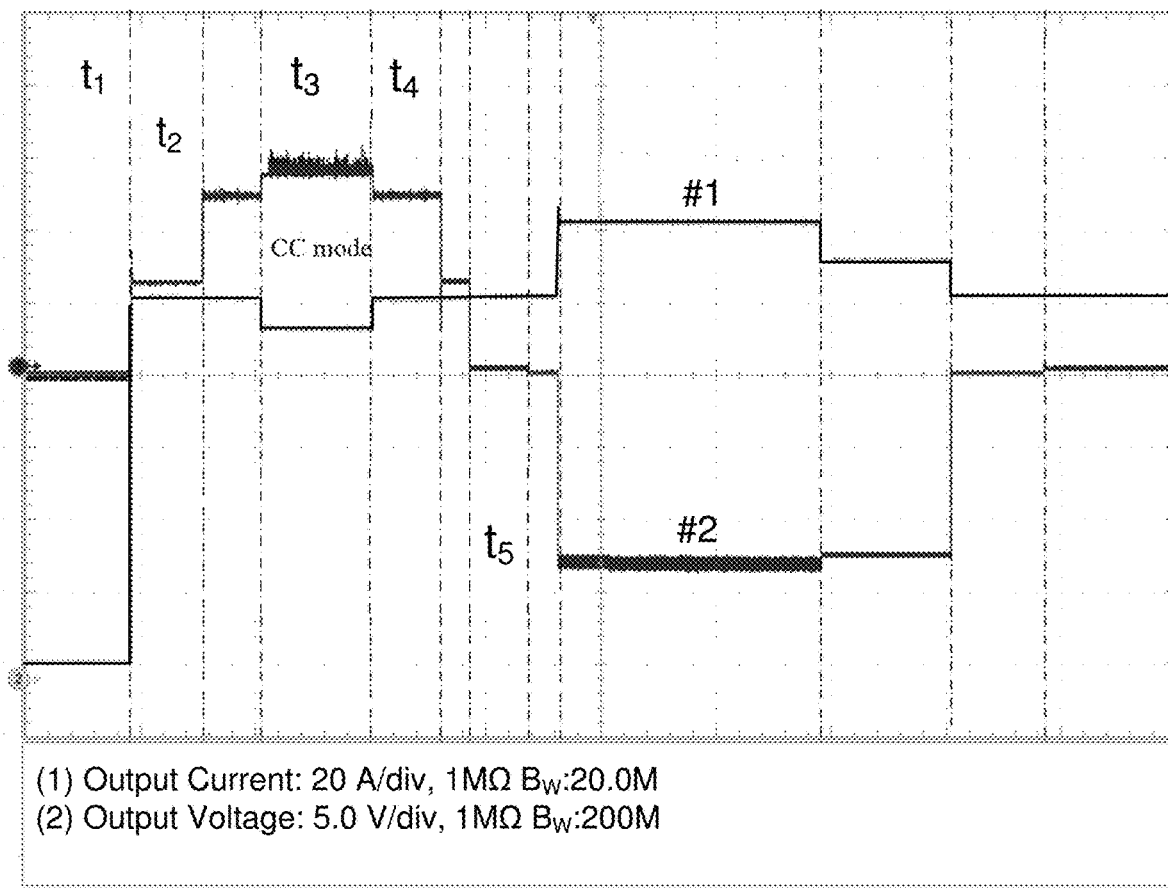
FIG. 10 depicts experimental results during operation for output current protection.

FIG. 10 demonstrates operation of the battery pack in constant current mode. FIG. 10 shows the scope traces for the output voltage and current of the pack. In this test, the output current limit is set to ±62 A. At $t_1$, the pack initiates the bus at a 25 A constant current load. At $t_2$, the load increased to 45 A, and a slight drop in the bus voltage is observed. At $t_1$, a 1Ω resistor is connected at the output, which triggers the output current loop. The output current is limited to 62 A, and the bus voltage collapses. This emulates a possible heavy loading condition on the PnP microgrid bus. At $t_4$, the resistor is disconnected, and the load current drops back to 25 A. At $t_5$, the bidirectional source supplies current, the voltage of the bus moves to the MPPT $VB_4$ zone, and the output current loop limits the charging current to 62 A.

Figure 11:
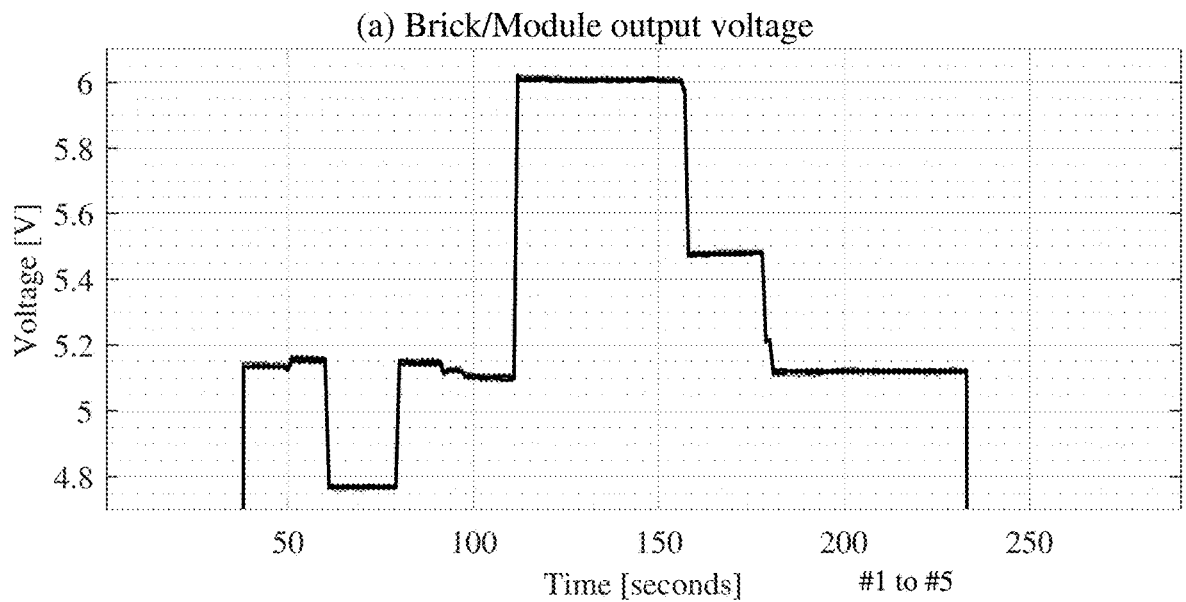
FIG. 11 depicts experimental results during operation for module differential voltages.
Figure 12:
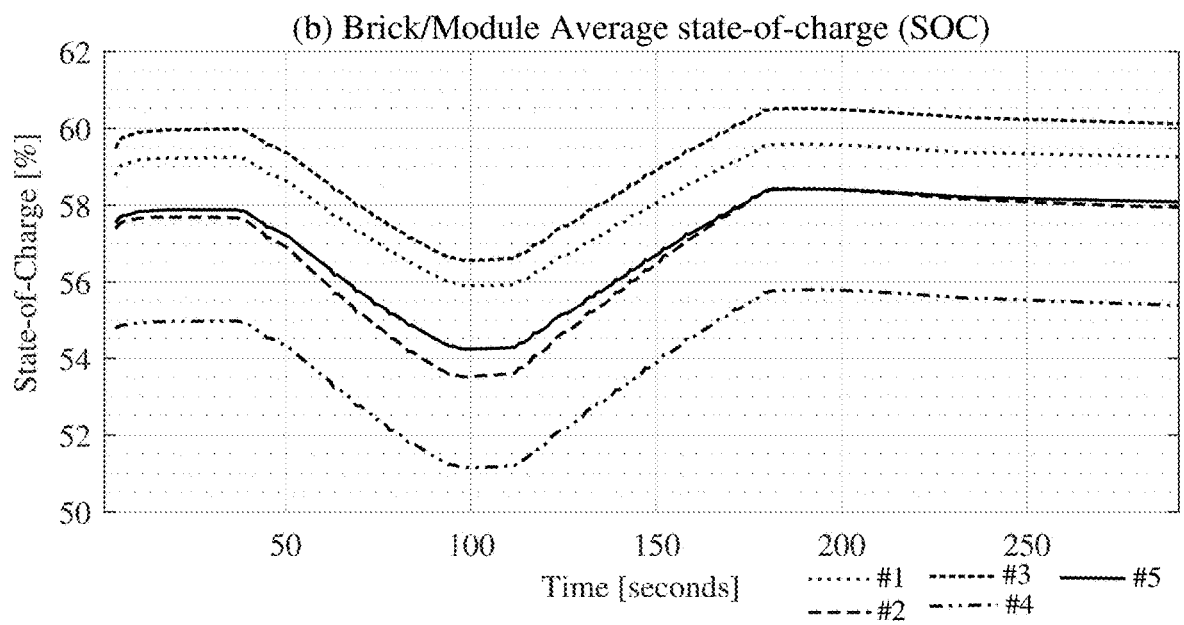
FIG. 12 depicts experimental results during operation of individual module state-of-charges.

FIG. 11 shows the averaged voltages across the individual modules 1-5 captured digitally from the CAN communication bus. Note that the traces for modules 1-5 are on top of each other for the most part. It can be observed that voltage sharing among the modules remains within 50 mV in both charging and discharging modes. The SOC of each module is plotted in FIG. 12. Consistent voltage sharing in FIG. 11 is achieved because of the voltage sharing loop, as the DC/DC converters regulate the input currents, and the battery SOCs are different, as shown in FIG. 12. It is important to mention that the output voltage sharing ensures that all cells supply or absorb the same power, which is different from SOC or SOH balancing. SOC and SOH balancing loops are available in the prototype active BMS system, but are not explicitly discussed or demonstrated herein.

Current regulation is employed instead to improve modularity. In some embodiments, the controller utilizes existing cell current sensors for regulation purposes, which eliminates the need for additional output current sensors. Steady-state output voltage sharing errors are discussed. By regulating the input current of each cell, the steady-state voltage sharing errors become operating point dependent. Moreover, by separating charging and discharging voltage ranges on the bus, and by regulating the cell currents, an asymmetry arises between charging and discharging modes. To address this issue, an I-V droop is employed. Since boost converters are utilized, the steady-state ($I_{in}/V_o$) characteristic is not linear, so a current-dependent droop coefficient is used to ensure voltage and power sharing among the modules. The approach is validated experimentally using a 1.5 kW active BMS 202 consisting of 15 DC/DC converters forming five series connected modules. Experimental results verify successful voltage and power sharing among the modules.

State-of-Charge Control with Series Output Connected DC-DC Modules

I. Introduction

In modern power grids, renewable energy and electric vehicles ("EVs") are the important sources and loads. Due to the intermittent nature of renewables and EV charging, battery energy storage systems ("BESS") have become crucial for maintaining power balance in such grids. Lithium-ion ("Li-ion") batteries are the most mature in BESS; however, they have a relatively low terminal voltage compared to typical high-voltage application requirements. As a result, a typical battery pack consists of series-connected cells, and the pack is interfaced to the high-voltage bus through a single DC/DC converter. Although the series-connection of cells is the most straightforward approach, the worst cell limits the operation of the entire battery pack, where the role of a BMS 202 and cell balancing algorithms become critical. A BMS 202 ensures that all cells operate within their safety limits and maximizes the operational life of the battery pack by utilizing balancing circuits. Cell-level balancing can be either passive or active. In passive balancing, the cell with high state-of-charge ("SOC") dissipates energy in a resistor, which reduces system efficiency. Active balancing systems rely on modular DC/DC converters connected across each battery cell or groups of cells to regulate the individual cell SOC. Moreover, by controlling the max SOC and the depth of discharge ("DoD") of each cell, active balancing systems may also be capable of regulating the state-of-health ("SOH") of each cell, which extends the lifetime of the battery pack. However, SOH control is a complicated process in conventional balancing systems.

FIG. 2 shows N modular series output connected DC/DC converters (modules) supplied from individual battery cells. The modular low-voltage converters replace the single bulky high-voltage DC/DC converter connected to a typical battery pack. This modular approach typically increases the system efficiency. Embodiments discussed herein focus on battery average SOC regulation and SOC control between the battery modules interfaced to a high-voltage bus through series output connected DC/DC converters shown in FIG. 2.

Other systems utilize boost converters and adjust the duty ratios of the converters to implement scheduled balancing between the series modules during charging. The BMS 202 sorts the battery modules according to their initial SOCs before charging. This approach is limited due to, (1) balancing is restricted to the charging mode, (2) it focuses only on the least charged module $SOC_{min}$, and (3) it assumes that all modules have to charge to 100%. In other systems, SOC balancing between the series modules is achieved in both discharging and charging modes by employing buck converters. During charging, a single module regulates its input (cell) current, and "N−1" modules regulate their output voltages. During discharging, all converters regulate their output voltages to track the desired bus voltage.

In both charging and discharging modes, the central BMS 202 adjusts all module voltage references to balance their SOCs. This approach is limited due to, (1) it is applicable only to a fixed voltage system, (2) local module controllers are not the same for charging and discharging modes, and (3) complexity in increasing the system capacity that requires paralleling strings in the same battery pack or full battery packs to the same output bus. In other systems, buck converters are employed, all modules track a constant output current reference, and the individual modules introduce a virtual admittance that depends on the desired SOC range of the module. Although this approach is aimed to decentralize the system, the approach has limitations, (1) programming a constant current reference in each module restricts the operation to a fixed load and voltage application, (2) the bus voltage collapses as the SOC of a module reaches a limit, (3) each module requires the knowledge of the current reference to determine charging or discharging modes and admittance values, (4) system stability during charging is dependent on SOC estimation algorithm that may not be suitable in a high-power application with frequent voltage disturbances, and (5) SOH control is not feasible with this approach.

In embodiments disclosed herein, the battery pack is connected to a DC microgrid with wide voltage variations. As a result, module SOC regulation cannot rely on individual module output voltage regulation. The BMS 202 regulates the battery average SOC according to the bus voltage by regulating all battery cell currents to a common reference; the BMS 202 introduces input current offsets for individual module SOC control. Thus, increasing system capacity by paralleling more units of different capacities or chemistries becomes feasible.

II. Control Architecture

Figure 13:
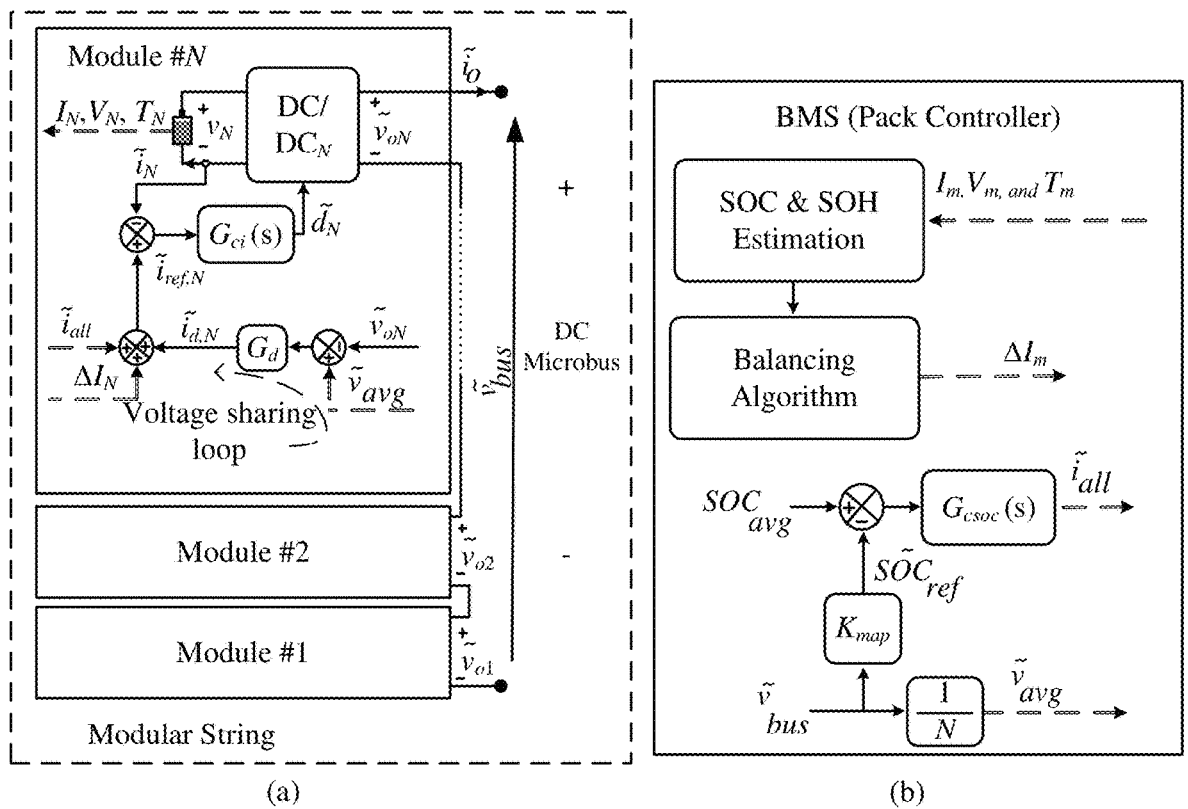
FIG. 13 is a schematic block diagram illustrating one embodiment of a system-level control diagram. (a) modular string consisting of N modules highlighting the module level controller function, (b) battery pack controller ("BMS")

FIG. 13(a) shows a modular string (dashed black lines) consisting of N series output connected battery modules. In each module, a DC/DC converter regulates its input (cell) current by utilizing a current compensator $G_{ci}$ that is identical for all modules. All modules share two identical quantities, (1) a common current reference $\tilde{i}_{all}$, and (2) the averaged bus $$\tilde{v}_{avg} = \frac{\tilde{v}_{bus}}{N}$$

to calculate a local droop current $\tilde{i}_d$. However, each module requires a unique current offset $\Delta I$ to control the module SOC, for instance, the $j^{th}$ module receives $\Delta I_j$. Thus, the current reference for the $j^{th}$ converter is given by $\tilde{i}_{ref,j} = \tilde{i}_{ref,all} + \tilde{i}_{d,j} + \Delta I_j$. Each module controller may estimate the local SOC and SOH, and then transmit the values to the BMS 202. However, this can be a computationally exhaustive task for a low-cost microcontroller.

In some embodiments, a battery pack is a centralized system with an existing communication network; thus, all modules transmit the measured-average cell current, cell voltage, and temperature to the BMS 202, where an advanced SOC, such as with sigma-point Kalman filters ("SPKF"), and SOH estimators are implemented in a microcontroller. FIG. 13(b) shows the BMS (pack controller) functions, where SOC, SOH, balancing algorithm, and pack average SOC regulation loop are implemented. The BMS 202 measures the total bus voltage $\tilde{v}_{bus}$ and regulates the pack average SOC $SOC_{avg}$ according to a voltage map, which is described in the next section. As a result, the modular string in FIG. 13(a) can be connected in series with other strings to increase the output voltage, or in parallel to increase the system capacity, which improves modularity within the battery pack.

III. Battery Average SOC Regulation

In a practical system, sources and loads can be connected or removed from the grid at any time, which requires modifying the current reference. As described herein, the battery pack is connected to a plug-and-play DC microgrid with wide voltage variations and relies on DC bus voltage signaling for operation. The battery pack regulates its average SOC according to the to the measured bus voltage. This approach allows connecting battery packs of different capacities and chemistries to the system while balancing their SOCs. As discussed above, FIG. 1 shows a voltage map that divides the bus voltage into charging and discharging zones and defines the desired SOC: $\tilde{SOC}_{ref} = K_{map}\tilde{v}_{bus}$ bus of any battery pack connected to the bus by monitoring the voltage, where Kmap is a constant. The BMS 202 estimates SOCs of all cells, calculates the pack $SOC_{avg}$, and utilizes a SOC compensator Gsoc to track the desired average SOC $\tilde{SOC}_{ref}$. The current reference in equation (16) is the common input current required from all modules to regulate the pack average $SOC_{avg}$ to $\tilde{SOC}_{ref}$ $$\tilde{i}_{all} = G_{soc}(\tilde{SOC}_{fb} - K_{map}\tilde{v}_{bus}). \tag{16}$$

For N modules, $SOC_{avg}$ of the battery pack is given in equation (19), where $SOC_{j,0}$; $Q_j$, $i_j$, are the initial SOC, capacity, and cell input current of the $j^{th}$ module, respectively $$SOC_{avg} = \frac{1}{N}\left(\sum_{j=1}^{N} SOC_j\right), \tag{17}$$

$$SOC_{avg,0} = \frac{\sum_{j=1}^{N} SOC_{j,0}}{N}, \tag{18}$$

$$SOC_{avg} = SOC_{avg,0} - \frac{1}{N}\left[\sum_{j=1}^{N}\left(\frac{\int_0^t i_j(t)dt}{Q_j}\right)\right]. \tag{19}$$

Ideally, all modules track the common current reference and have identical capacities Q, which simplifies the average SOC, $$SOC_{avg} = SOC_{avg,0} - \frac{\int_0^t i_{all}(t)dt}{NQ}. \tag{20}$$

Figure 14:
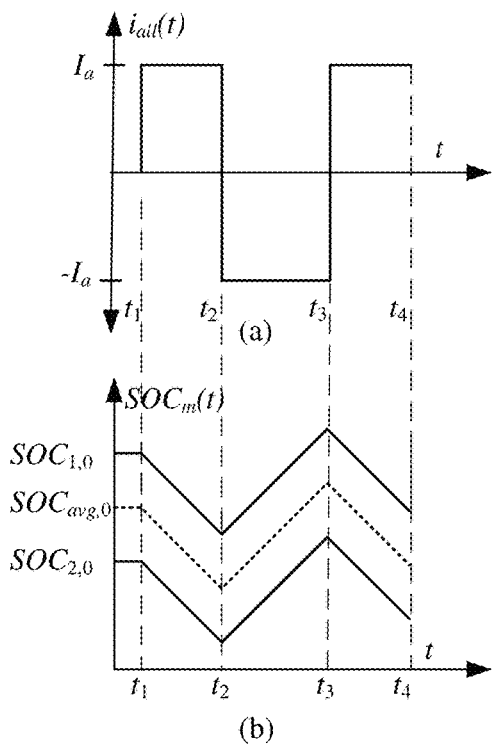
FIG. 14 depicts input current and state-of-charge ("SOC") relationships with (a) a common current reference $I_{all}$ and (b) corresponding SOC for the common current reference $I_{all}$.

FIG. 14(a) shows an arbitrary common current reference $i_{all}$ for a two-module system. FIG. 14(b) shows the corresponding $SOC_{avg}$ waveform and SOC waveforms for the two modules assuming that the system is stable. For different initial SOCs, $SOC_{1,0}$, and $SOC_{2,0}$, an additional loop is required to control their individual SOCs.

IV. Individual Module SOC Control

In the previous section, all module input currents track $i_{all}$ to regulate the pack average SOC loop. As a result, each module behaves as a constant power source in discharging and a constant power load while charging. A system instability was described due to output voltage mismatches between the series-connected modules. A droop loop is employed to ensure equal voltage sharing to stabilize the overall system. Consequently, each module adjusts the common current reference by adding $\tilde{i}_d$ for output voltage sharing; the $j^{th}$ module droop current is given in equation (21), where $G_d$ is a droop conductance, $\tilde{v}_{o,j}$ is the measured module output voltage, and $$\frac{\tilde{v}_{bus}}{N}$$

is the averaged bus voltage message, $$\tilde{i}_{d,j} = G_d\left(\frac{\tilde{v}_{bus}}{N} - \tilde{v}_{o,j}\right) \tag{21}$$

Figure 15:
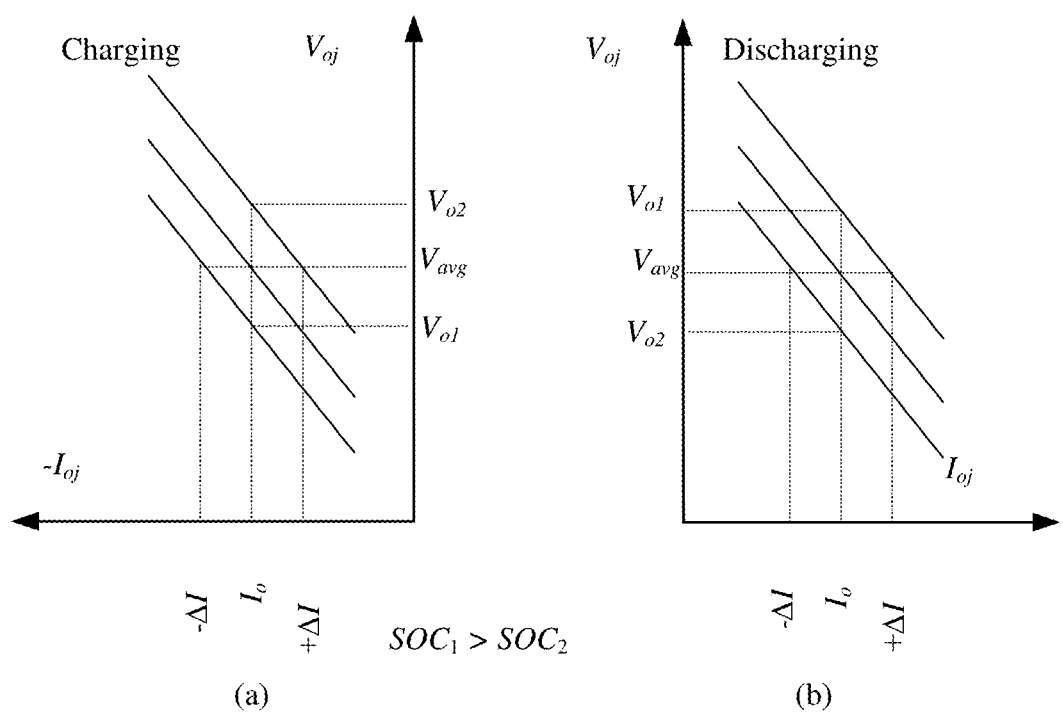
FIG. 15 depicts desired droop characteristics for (a) charging and (b) discharging.

Equal voltage sharing across the series connected-modules ensures equal power sharing between the modules, which counters module-level SOC control. Therefore, the desired steady-state droop characteristics $V_o$–I should be modified such that a module with the highest SOC carries the lowest voltage during charging and the highest voltage during discharging. FIG. 15 shows this desired behavior for a two-module case during charging and discharging modes.

At steady-state, the output current $I_o$ determines $V_{avg}$ and the SOC control algorithm finds $\Delta I_j$ that shifts the module voltage from $V_{avg}$ at a given battery pack output current $I_o$. Thus, SOC for the $j^{th}$ module can be controlled:

$$SOC_j = SOC_{j,0} - \left(\frac{\int_0^t (i_{all}(t) + i_{d,j}(t) + \Delta i_j(t))dt}{Q_j}\right) \tag{22}$$

$$SOC_{avg} = SOC_{avg,0} - \left[\sum_{j=1}^{N}\left(\frac{\int_0^t (i_{all}(t) + i_{d,j}(t) + \Delta i_j(t))dt}{NQ_j}\right)\right] \tag{23}$$

The term $\sum_{j=1}^{N} i_{d,j}(t)$ in equation (23) is zero at equilibrium, assuming that all modules have identical capacities and are ideal. Moreover, to decouple the interaction between the balancing loop and $\Delta i_j$ the common current loop $i_{all}$, the balancing loop updates the balancing current at the SOC estimation rate, which is very low compared to the common current reference rate. At steady state, a change in the output voltage $\Delta V_o$ of an ideal converter at a given output current $I_o$, input current $I_{in}$, and input voltage $V_{in}$, requires a change in the input current $\Delta I_{in}$ as given below:

$$V_o = M(D)V_{in} \tag{24}$$

$$I_{in} = M(D)I_o \tag{25}$$

$$\Delta I_{in} = \frac{I_{in}}{V_o}\Delta V_o \tag{26}$$

where, M(D) is the conversion ratio of the converter. It is evident in equation (26) that scaling the current offset with respect to $I_{in}$ improves the module SOC control loop. The DC/DC converter ratings limit the permissible amplitude of $\Delta I_{in}$.

V. Module SOC Balancing

If module SOC balancing is the objective, all modules track the average SOC of the battery pack $SOC_{avg}$. The balancing algorithm calculates the difference between the module $SOC_j$ and the battery $SOC_{avg}$ in equation (27), and uses the maximum absolute difference in SOC in the battery pack as a per-unit base in equation (28)

$$\Delta SOC_j = SOC_j - SOC_{avg}, \tag{27}$$

$$\Delta SOC_{j,pu} = \frac{SOC_j - SOC_{avg}}{\max\{|\Delta SOC|\}}, \tag{28}$$

$$\sum_{j=1}^{N} \Delta SOC_{j,pu} = 0. \tag{29}$$

Figure 16:
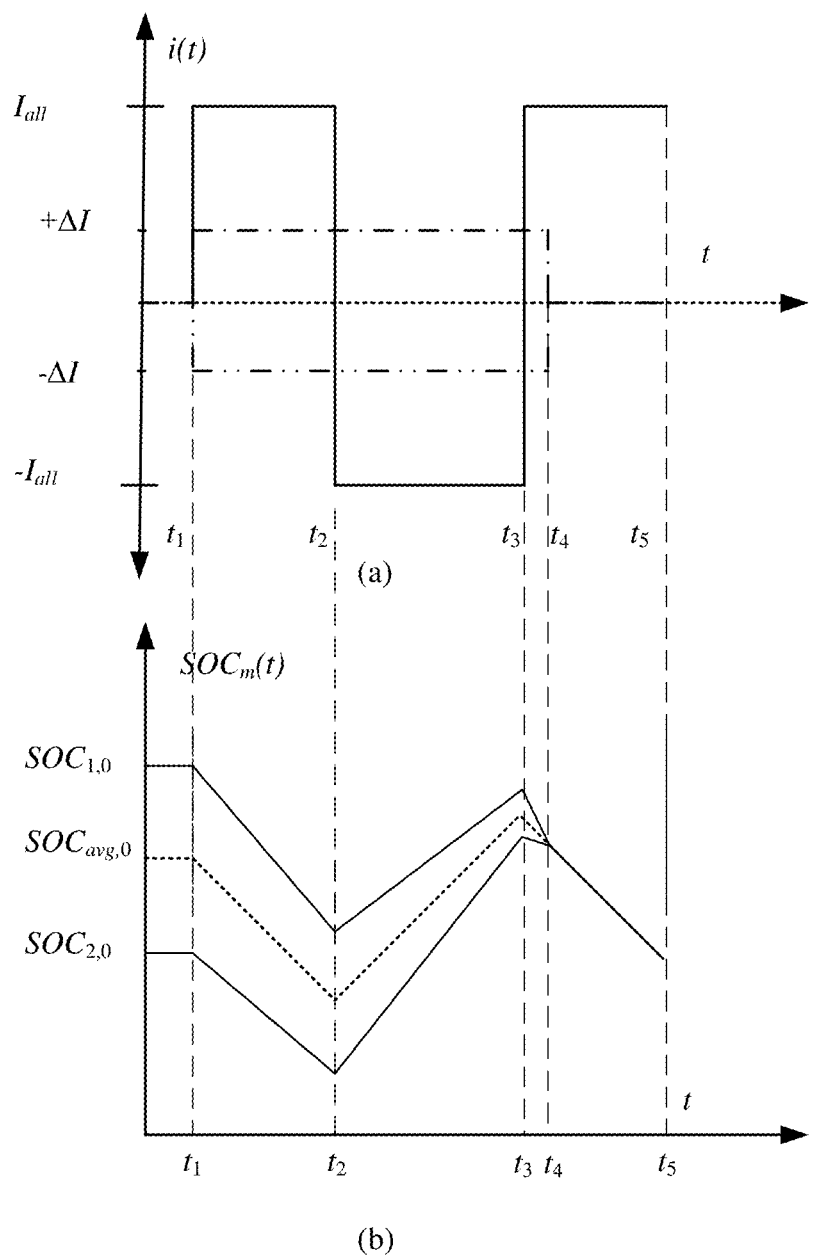
FIG. 16 depicts desired input current and SOC vs time relationships for (a) the common current reference $I_{all}$, +$\Delta I$ for module #1 and −$\Delta I$ for module #2, and (b) corresponding SOC for each module.

The BMS 202 multiplies the dimensionless $\Delta SOC_{j,pu}$ by a factor to achieve a current offset $\Delta I_j$. The pack average SOC loop is undisturbed because of module SOC balancing as in equation (29). FIG. 16(a) shows the steady-state common current reference waveform for the two-module case. It also shows the desired $\Delta I$ waveform to regulate the highest SOC module #1 to the average $SOC_{avg}$; Module #2 receives the inverted $\Delta I$ to achieve SOC balancing as in equation (29). FIG. 16(b) shows how the SOCs of the two modules converge to $SOC_{avg}$ at $t_4$. At $t_4$, the expressions in equations (27) and (28) become zero, which cancels $\Delta I$ command.

Figure 17:
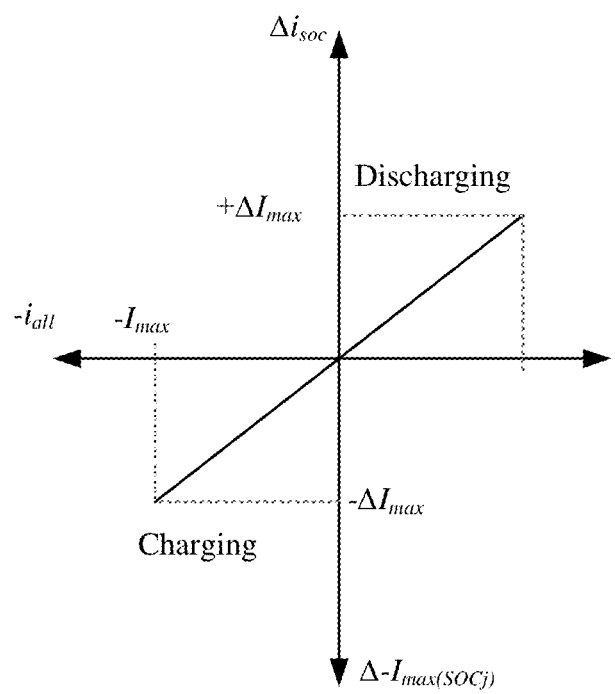
FIG. 17 is a diagram illustrating $\Delta I_{SOC}$-$I_{all}$ relationship.

Moreover, $\Delta I$ waveform in FIG. 16(a) is introduced to the modules such that the highest SOC module tracks a higher current reference during discharging and a lower current reference during charging in comparison with the lowest SOC module. Consequently, $\Delta I$ should incorporate the common current reference polarity to preserve the outcome of (29). FIG. 17 shows a graph for $\Delta I$ as a function $i_{all}$. The function is limited to $\pm \Delta I_{max}$ as the common current reference approaches $\pm I_{max}$ so that the maximum voltage across the modules is limited as in equation (26.)

In some embodiments, the BMS 202 generates the average converter output voltage $\tilde{v}_{avg}$ by dividing a DC microbus voltage $v_{bus}$ by the number of converters N and generates the common current reference $\tilde{i}_{all}$ of the battery pack as a function of an average state-of-charge ("SOC") of the battery modules of the battery pack and a bus voltage $v_{bus}$ of the DC microbus. The BMS 202, in some embodiments, calculates an average SOC for each of the N converters of the battery pack by calculating a difference between an initial average SOC of the battery pack and an integral over a period of time (0 to t) of a common current $i_{all}$ divided by a total charge capacity of the battery pack.

In other embodiments, the BMS 202 generates a current offset for each of the N converters, where the current offset for an $m^{th}$ converter of the N converters is based on a current SOC of the $m^{th}$ converter compared to the average state of charge for the N converters and the battery module controller 204m for the $m^{th}$ converter adds the current offset for the $m^{th}$ converter to the common current reference $\tilde{i}_{all}$. In other embodiments, the BMS 202 adjusts the current offset for each of the N converters until the SOC of each of the N converters reaches a desired SOC. In other embodiments, the BMS 202 adjusts the current offset for each of the N converters until the SOC of each of the N converters reaches a same SOC.

In some embodiments, the current offset for a converter of the N converters varies between a maximum positive current offset that corresponds to a positive maximum common current reference $I_{max}$ of a positive value of the common current reference $\tilde{i}_{all}$ and zero current offset at zero common current reference $\tilde{i}_{all}$ and varies between a maximum negative current offset that corresponds to a negative maximum common current reference $I_{max}$ of a negative value of the common current reference $\tilde{i}_{all}$ and zero current offset at zero common current reference $\tilde{i}_{all}$.

VI. Experimental Results

A modular battery string consisting of five series output connected modules has been developed. Each module consists of three independent four-switch buck-boost DC/DC converters. The three DC/DC converters are paralleled at the output to form a 300 W module that utilizes a single microcontroller to implement three identical input current compensators $G_{ci}$. Each converter is connected across a 25 Ah Panasonic® lithium-ion NMC cell. The system relies on a CAN communication network and acquires the sampled currents, voltages, and temperatures from all modules for SOC and SOH estimation. Moreover, the BMS 202 measures the bus voltage and runs the average SOC regulation loop $G_{csoc}$. The common current reference and the averaged bus voltage are transmitted to all modules over the CAN communication network.

The overall system with 15 DC-DC converters is rated at 1.5 kW. Each converter achieves 97.8% peak efficiency at 100% load. Table II lists the prototype parameters. The battery pack output current $I_o$ is monitored, where a positive output current is associated with discharging that flows into the bidirectional source. Similarly, a negative output current is associated with charging current that is supplied from the bidirectional source. Table II lists the prototype parameters.

TABLE II

| PROTOTYPE DAB PARAMETERS | |
|---|---|
| Parameter | Value |
| Cell Capacity | 25 Ah |
| Maximum input current | ±25 A |
| Number of cells | 15 |
| Number of converters | 15 |
| Number of modules | 5 |
| Maximum discharging voltage $V_2$ | 26 V |
| Minimum charging voltage $V_3$ | 26 V |
| Maximum charging voltage $V_{max}$ | 35 V |
| Maximum output current $I_{o,max}$ | ±62 A |
| Power rating | 1.5 kW |
| Minimum droop gain $G_{d,min}$ | 2 A/V |

TABLE II-continued

PROTOTYPE DAB PARAMETERS

| Parameter | Value |
|---|---|
| Maximum droop gain $G_{d,max}$ | 14 A/V |
| Minimum average $SOC_{min}$ | 20% |
| Maximum average $SOC_{max}$ | 90% |
| SOC-Voltage map gain $K_{map}$ | 50%/V |
| Maximum common input current $i_{all}$ | ±25 A |
| Maximum balancing current $\Delta I_{max}$ | ±5 A |

Figure 18:
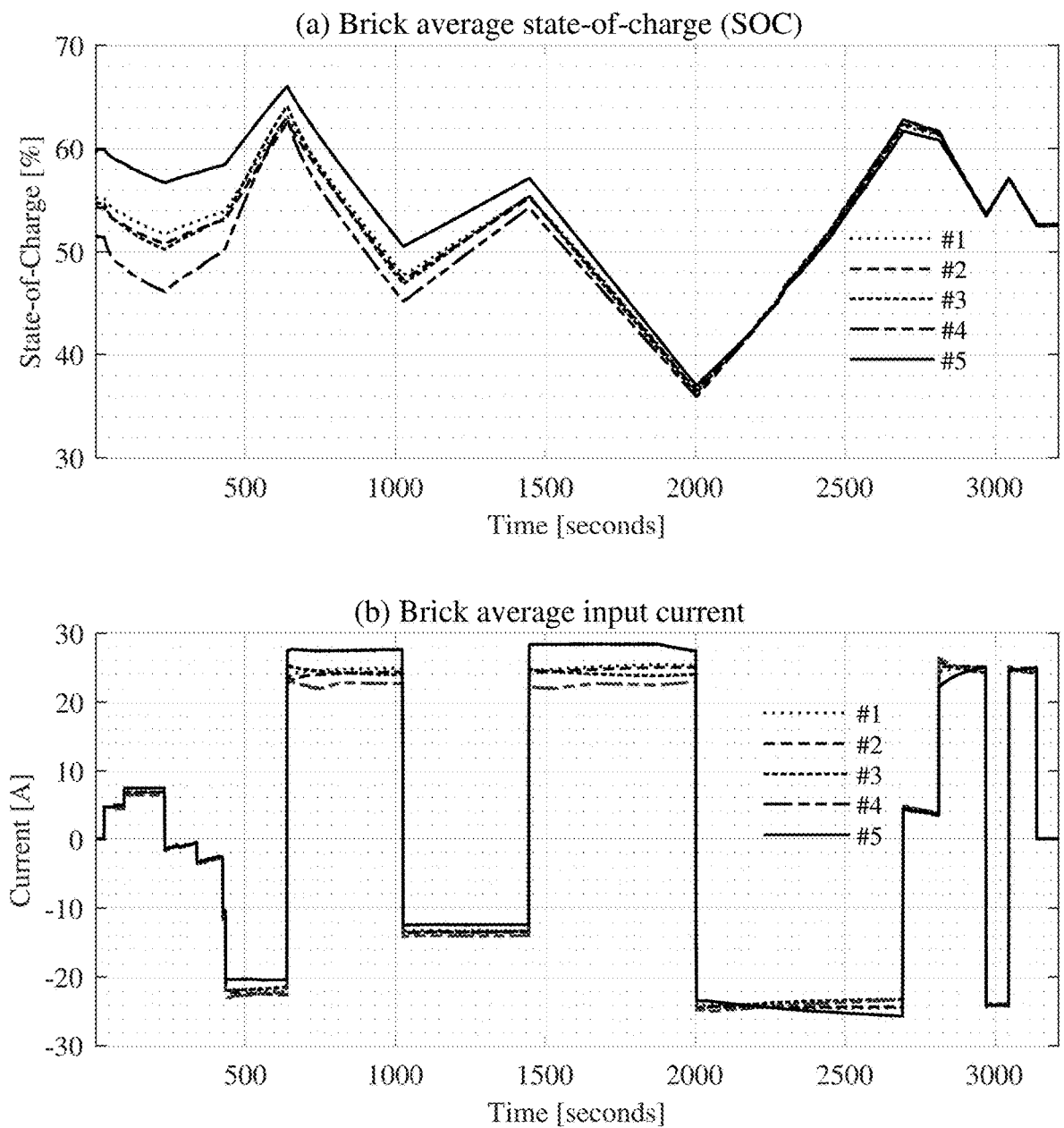
FIG. 18 depicts experimental results during operation of (a) battery pack output current $I_o$, (b) individual module output voltages, and (c) individual module SOC.

FIG. 18 shows the experimental results as acquired through the CAN communication network. In FIG. 18(a) the battery output current Io is flowing into the battery in the $t_{1-2}$ interval, where the initial module SOCs were 41.8%, 40.1%, 41.5%, 48.5%, and 52.6% that result in a battery pack average SOC at nearly 45% as shown in FIG. 18(c). At the beginning of the test, module #5 has the highest SOC and module #1 has the lowest a SOC. By controlling the bidirectional source, the bus voltage can be driven into the charging zone at voltages higher than 26 V, where the battery packs charges, or draw current from the bus as long as the bus voltage is below 26 V. In both cases, the BMS 202 regulates the battery pack average SOC according to the monitored bus voltage. Moreover, in the charging intervals $t_{1-2}$, $t_{3-4}$, $t_{5-6}$, $t_{7-8}$, and $t_{9-10}$, the output voltage across module #1 is higher than that across module #5 as shown in FIG. 18(b), to absorb more power from the bus. In the discharging intervals $t_{2-3}$, $t_{4-5}$, $t_{6-7}$, and $t_{8-9}$, the output voltage across module #1 is lower than that across module #5 as shown in FIG. 18(b), to inject less power into the bus. It is important to mention that the module output voltage waveform depend on the V-SOC characteristics of the battery cells because all the control loops regulate the input current of the modules. Around $t_{11}$, all module SOCs are approximately close to $SOC_{avg}$, thus the current offsets for all converters drop to zero. At this instant, all modules correspond to the common current command $i_{all}$, and the droop currents id. It is important to mention that the approach presented in this paper balances the SOCs of the three cells within a module, and implements SOH balancing loops; however, these loops are not explicitly discussed or demonstrated herein.

Existing SOC control schemes based on output voltage regulation are limited to fixed voltage applications. Current regulation is employed instead to enhance modularity. The battery pack regulates the average SOC according to the measured bus voltage, which allows connecting battery packs of different capacities or chemistries to the same bus. The BMS 202 regulates all cell currents to a common current reference for average SOC regulation. Furthermore, the BMS 202 introduces current offsets to the modules for individual SOC control. The balancing currents depend on the string current direction, amplitude, and ratings of the DC/DC converters. The approach is validated experimentally using a 1.5 kW active BMS consisting of 15 DC/DC converters forming five series connected modules. Experimental results verify successful average and module level SOC regulation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a battery module controller; and
a battery management system,
wherein the battery module controller:
generates, for an $m^{th}$ converter of N converters connected together to a DC microbus, a droop current $\tilde{i}_{d,m}$ comprising a converter voltage error signal $\tilde{v}_{err,m}$ multiplied by a non-linear droop multiplier $g_d(i)$, wherein each converter of the N converters is a DC/DC converter connected between a battery module and the DC microbus, the battery module comprising one or more battery cells,
wherein the $m^{th}$ converter uses the droop current $\tilde{i}_{d,m}$, a common current reference $\tilde{i}_{all}$ of a battery pack comprising the battery modules connected to the N converters and an input current $\tilde{i}_m$ to the $m^{th}$ converter to control switching of the $m^{th}$ converter, the common current reference $\tilde{i}_{all}$ provided by the battery management system, and
wherein the voltage error signal $\tilde{v}_{err,m}$ is based on an output voltage $\tilde{v}_{o,m}$ of the $m^{th}$ converter and an average converter output voltage $\tilde{v}_{avg}$.

2. The apparatus of claim 1, wherein the non-linear droop multiplier $g_d(i)$ varies between a minimum droop multiplier $G_{d,min}$ and a maximum droop multiplier $G_{d,max}$, wherein the non-linear droop multiplier $g_d(i)$ is the minimum droop multiplier $G_{d,min}$ during battery discharging and varies linearly between the maximum droop multiplier $G_{d,max}$ at a maximum battery charging rate and the minimum droop multiplier $G_{d,min}$ at a zero charging rate.

3. The apparatus of claim 2, wherein the non-linear droop multiplier $g_d(i)$ is $$g_d(i) = \begin{cases} G_{d,min}; & i_{all} \geq 0 \\ G_{d,min} + \dfrac{G_{d,min} - G_{d,max}}{I_{all,max}}; & i_{all} < 0 \end{cases}$$

where:
$i_{all}$ is the common current reference of a battery pack comprising the battery modules connected to the N converters, and
$I_{all,max}$ is a maximum value for the common current reference which correlates to the maximum battery charging rate.

4. The apparatus of claim 1, wherein the $m^{th}$ converter using the droop current $\tilde{i}_{d,m}$, the common current reference $i_{ref}$ and the input current $\tilde{i}_m$ to the $m^{th}$ converter to control switching of the $m^{th}$ converter comprises the battery module controller:
generating, for the $m^{th}$ converter, a converter current reference $\tilde{i}_{ref,m}$ comprising a sum of the droop current $\tilde{i}_{d,m}$ and the common current reference $i_{ref}$; and
generating, for the $m^{th}$ converter, a local current command $\tilde{i}_{err,m}$ comprising a difference between the converter current reference $\tilde{i}_{ref,m}$ and an input current $\tilde{i}_m$ to the $m^{th}$ converter,
a duty cycle $\tilde{d}_m$ for the $m^{th}$ converter comprising the local current command $\tilde{i}_{err,m}$ multiplied by a current compensator $G_{ci}(s)$, wherein the duty cycle controls switching of the $m^{th}$ converter.

5. The apparatus of claim 1, wherein the voltage error signal $\tilde{v}_{err,m}$ being based on the output voltage $\tilde{v}_{o,m}$ of the $m^{th}$ converter and the average converter output voltage $\tilde{v}_{avg}$ comprises the battery module controller generating, for the $m^{th}$ converter, the voltage error signal $\tilde{v}_{err,m}$ for the $m^{th}$ converter comprising a difference between the average converter output voltage $\tilde{v}_{avg}$ and the output voltage $\tilde{v}_{o,m}$ of the $m^{th}$ converter.

6. The apparatus of claim 1, wherein the battery management system:
generates the average converter output voltage $\tilde{v}_{avg}$ by dividing a DC microbus voltage $v_{bus}$ by the number of converters N; and
generates the common current reference $\tilde{i}_{all}$ of the battery pack as a function of an average state-of-charge ("SOC") of the battery modules of the battery pack and a bus voltage $v_{bus}$ of the DC microbus.

7. The apparatus of claim 6, wherein the battery management system calculates an average SOC for each of the N converters of the battery pack by calculating a difference between an initial average SOC of the battery pack and an integral over a period of time (0 to t) of a common current $i_{all}$ divided by a total charge capacity of the battery pack.

8. The apparatus of claim 7, wherein the battery management system generates a current offset for each of the N converters, wherein the current offset for an $m^{th}$ converter of the N converters is based on a current SOC of the $m^{th}$ converter compared to the average state of charge for the N converters and wherein the battery module controller for the $m^{th}$ converter adds the current offset for the $m^{th}$ converter to the common current reference $\tilde{i}_{all}$.

9. The apparatus of claim 8, wherein the battery management system adjusts the current offset for each of the N converters until the SOC of each of the N converters reaches a desired SOC.

10. The apparatus of claim 8, wherein the battery management system adjusts the current offset for each of the N converters until the SOC of each of the N converters reaches a same SOC.

11. The apparatus of claim 7, wherein the current offset for a converter of the N converters varies between a maximum positive current offset that corresponds to a positive maximum common current reference $I_{max}$ of a positive value of the common current reference $\tilde{i}_{all}$ and zero current offset at zero common current reference $\tilde{i}_{all}$ and varies between a maximum negative current offset that corresponds to a negative maximum common current reference $I_{max}$ of a negative value of the common current reference $\tilde{i}_{all}$ and zero current offset at zero common current reference $\tilde{i}_{all}$.

12. The apparatus of claim 6, wherein for a voltage range of the bus voltage $v_{bus}$ of the DC microbus between a minimum bus voltage $v_{bus,min}$ corresponding to a minimum state-of-charge $SOC_{min}$ of the battery pack and a maximum bus voltage $v_{bus,max}$ corresponding to a maximum state-of-charge $SOC_{max}$ of the battery pack, the battery management system generates a negative common current reference $\tilde{i}_{all}$ for a lower voltage range and a positive common current reference $\tilde{i}_{all}$ for an upper voltage range above the lower voltage range.

13. An apparatus comprising:
a battery module controller; and
a battery management system,
wherein the battery management system:
generates, for N converters connected together to a DC microbus, an average converter output voltage $\tilde{v}_{avg}$ by dividing a DC microbus voltage $v_{bus}$ by the number of converters N, wherein each converter of the N converters is a DC/DC converter connected between a battery module and the DC microbus, the battery modules of the N converters forming a battery pack, the battery module comprising one or more battery cells; and
generates a common current reference $\tilde{i}_{all}$ of the battery pack as a function of an average state-of-charge ("SOC") of the battery modules of the battery pack and a bus voltage $v_{bus}$ of the DC microbus,
wherein for a voltage range of the bus voltage $v_{bus}$ of the DC microbus between a minimum bus voltage $v_{bus,min}$ corresponding to a minimum state-of-charge $SOC_{min}$ of the battery pack and a maximum bus voltage $v_{bus,max}$ corresponding to a maximum state-of-charge $SOC_{max}$ of the battery pack, the battery management system generates a negative common current reference $\tilde{i}_{all}$ for a lower voltage range and a positive common current reference $\tilde{i}_{all}$ for an upper voltage range above the lower voltage range,
wherein for an $m^{th}$ converter of the N converters, the battery module controller for the $m^{th}$ converter uses the average converter output voltage $\tilde{v}_{avg}$ and the common current reference $\tilde{i}_{all}$ along with an input current input current $\tilde{i}_m$ to the $m^{th}$ converter and an output voltage output voltage $\tilde{v}_{o,m}$ of the $m^{th}$ converter to control switching of the $m^{th}$ converter to control the output voltage output voltage $\tilde{v}_{o,m}$ of the $m^{th}$ converter and charging and discharging of the battery module connected to the of the $m^{th}$ converter.

14. The apparatus of claim 13, wherein the battery module controller for an $m^{th}$ converter of N converters:
generates, for the $m^{th}$ converter, a droop current $\tilde{i}_{d,m}$ comprising a converter voltage error signal $\tilde{v}_{err,m}$ multiplied by a non-linear droop multiplier $g_d(i)$,
wherein the $m^{th}$ converter uses the droop current $\tilde{i}_{d,m}$, the common current reference $\tilde{i}_{all}$ and the input current $\tilde{i}_m$ to the $m^{th}$ converter to control switching of the $m^{th}$ converter, and
wherein the voltage error signal $\tilde{v}_{err,m}$ is based on an output voltage $\tilde{v}_{o,m}$ of the $m^{th}$ converter and an average converter output voltage $\tilde{v}_{avg}$.

15. The apparatus of claim 13, wherein the battery management system calculates an average SOC for each of the N converters of the battery pack by calculating a difference between an initial average SOC of the battery pack and an integral over a period of time (0 to t) of a common current $i_{all}$ divided by a total charge capacity of the battery pack.

16. The apparatus of claim 15, wherein the battery management system calculates an average SOC for each of the N converters of the battery pack by calculating a difference between an initial average SOC of the battery pack and an integral over a period of time (0 to t) of a common current $i_{all}$ divided by a total charge capacity of the battery pack.

17. The apparatus of claim 16, wherein the battery management system generates a current offset for each of the N converters, wherein the current offset for an $m^{th}$ converter of the N converters is based on a current SOC of the $m^{th}$ converter compared to the average state of charge for the N converters and wherein the battery module controller for the $m^{th}$ converter adds the current offset for the $m^{th}$ converter to the common current reference $\tilde{i}_{all}$.

18. A method comprising:
generating, in a battery module controller for an $m^{th}$ converter of N converters connected together to a DC microbus, a droop current $\tilde{i}_{d,m}$ comprising a converter voltage error signal $\tilde{v}_{err,m}$ multiplied by a non-linear droop multiplier $g_d(i)$, wherein each converter of the N converters is a DC/DC converter connected between a battery module and the DC microbus, the battery module comprising one or more battery cells; and using the droop current $\tilde{i}_{d,m}$, a common current reference $\tilde{i}_{all}$ of a battery pack comprising the battery modules connected to the N converters and an input current $\tilde{i}_m$ to the $m^{th}$ converter to control switching of the $m^{th}$ converter, the common current reference $\tilde{i}_{all}$ provided by a battery management system, wherein the voltage error signal $\tilde{v}_{err,m}$ is based on an output voltage $\tilde{v}_{o,m}$ of the $m^{th}$ converter and an average converter output voltage $\tilde{v}_{avg}$.

19. The method of claim 18, wherein the non-linear droop multiplier $g_d(i)$ varies between a minimum droop multiplier $G_{d,min}$ and a maximum droop multiplier $G_{d,max}$, wherein the non-linear droop multiplier $g_d(i)$ is the minimum droop multiplier $G_{d,min}$ during battery discharging and varies linearly between the maximum droop multiplier $G_{d,max}$ at a maximum battery charging rate and the minimum droop multiplier $G_{d,min}$ at a zero charging rate, wherein the non-linear droop multiplier $g_d(i)$ is $$g_d(i) = \begin{cases} G_{d,min}: & i_{all} \geq 0 \\ G_{d,min} + \dfrac{G_{d,min} - G_{d,max}}{I_{all,max}}: & i_{all} < 0 \end{cases}$$

where:

$i_{all}$ is the common current reference of a battery pack comprising the battery modules connected to the N converters, and $I_{all,max}$ is a maximum value for the common current reference which correlates to the maximum battery charging rate.

20. The method of claim 18, wherein the $m^{th}$ converter using the droop current $\tilde{i}_{d,m}$, the common current reference $i_{ref}$ and the input current $\tilde{i}_m$ to the $m^{th}$ converter to control switching of the $m^{th}$ converter comprises:

generating, with the battery module controller for the $m^{th}$ converter, a converter current reference $\tilde{i}_{ref,m}$ comprising a sum of the droop current $\tilde{i}_{d,m}$ and the common current reference $i_{ref}$; and generating, with the battery module controller for the $m^{th}$ converter, a local current command $\tilde{i}_{err,m}$ comprising a difference between the converter current reference $\tilde{i}_{ref,m}$ and an input current $\tilde{i}_m$ to the $m^{th}$ converter, a duty cycle $\tilde{d}_m$ in the battery module controller for the $m^{th}$ converter comprising the local current command $\tilde{i}_{err,m}$ multiplied by a current compensator $G_{ci}(s)$, wherein the duty cycle controls switching of the $m^{th}$ converter.

* * * * *

UNITED STATES PATENT AND TRADEMARK OFFICE
CERTIFICATE OF CORRECTION

| | | |
|---|---|---|
| PATENT NO. | : 11,735,782 B2 | Page 1 of 1 |
| APPLICATION NO. | : 17/350880 | |
| DATED | : August 22, 2023 | |
| INVENTOR(S) | : Mohamed Ahmed Kamel Ahmed, Regan Zane and Dragan Maksimovic | |

It is certified that error appears in the above-identified patent and that said Letters Patent is hereby corrected as shown below:

On the Title Page (12):
Please delete "United States Patent Kamel Ahmed et al." and insert --United States Patent Ahmed et al.--.

Signed and Sealed this
Eleventh Day of November, 2025

John A. Squires
*Director of the United States Patent and Trademark Office*